(12) United States Patent
Maeda et al.

(10) Patent No.: US 8,186,834 B2
(45) Date of Patent: May 29, 2012

(54) ILLUMINATION APPARATUS AND PROJECTION-TYPE IMAGE DISPLAY APPARATUS

(75) Inventors: Makoto Maeda, Osaka (JP); Ken Mashitani, Neyagawa (JP); Kazuhiro Arai, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 12/851,099

(22) Filed: Aug. 5, 2010

(65) Prior Publication Data

US 2010/0302512 A1     Dec. 2, 2010

Related U.S. Application Data

(63) Continuation of application No. 11/862,878, filed on Sep. 27, 2007, now Pat. No. 7,798,649.

(30) Foreign Application Priority Data

Sep. 29, 2006   (JP) .................. 2006-270066
Aug. 31, 2007   (JP) .................. 2007-227006

(51) Int. Cl.
    *G03B 21/14*     (2006.01)

(52) U.S. Cl. ............................... 353/31; 353/34; 349/4 A
(58) Field of Classification Search ................... 353/20, 353/31, 33, 34, 37, 81, 84; 349/5, 7, 8, 9; 348/339, 758
See application file for complete search history.

(56) References Cited

U.S. PATENT DOCUMENTS 7,364,305 B2 *   4/2008   Itoh ................. 353/31
2005/0248736 A1 *  11/2005  Itoh ................ 353/102

* cited by examiner

*Primary Examiner* — Tony Ko
(74) *Attorney, Agent, or Firm* — Marvin A. Motsenbocker; MOTS Law, PLLC

(57) ABSTRACT

An illumination apparatus includes: a red light valve configured to modulate red component light according to a red input signal; a green light valve configured to modulate green component light according to a green input signal; a blue light valve configured to modulate blue component light according to a blue input signal; a fourth color light valve configured to modulate a fourth color component light; and a color combiner configured to combine light emitted from the red light valve, the green light valve and the blue light valve. The fourth color component light emitted from the fourth color light valve enters a certain light valve, which is any one of the red light valve, the green light valve and the blue light valve.

7 Claims, 18 Drawing Sheets

FIG. 6

| | | COLOR SIGNAL | | | |
|---|---|---|---|---|---|
| | | R | G | B | Ye |
| DISPLAY COLOR | BLACK | — | — | — | — |
| | WHITE | ○ | ○ | ○ | ○ |
| | R | ○ | — | — | — |
| | G | — | ○ | — | — |
| | B | — | — | ○ | — |
| | Ye | ○ | ○ | — | △ |
| | OTHER | ○ | ○ | ○ | ○ |

ILLUMINATION APPARATUS AND PROJECTION-TYPE IMAGE DISPLAY APPARATUS

CROSS REFERENCE TO RELATED APPLICATIONS

This application is a continuation of application Ser. No. 11/862,878, filed on Sep. 27, 2007, which is based upon and claims the benefit of priority from prior Japanese Patent Application No.2006-270066, filed on Sep. 29, 2006; and Japanese Patent Application No.2007-227006, filed on Aug. 31, 2007; the entire contents of which are incorporated herein by to reference.

BACKGROUND OF THE INVENTION

1. Field of the Invention

The present invention relates to an illumination apparatus and a projection-type image display apparatus, which utilize fourth color component light in addition to red component light, green component light and blue component light.

2. Description of the Related Art

Conventionally, a projection-type image display apparatus has been known, which provided with three light valves corresponding to light of three colors, a cross dichroic cube that combines light beams emitted from three light valves and a projection mean that projects light combined by the cross dichroic cube.

Herein, the cross dichroic cube has three light incident surfaces on which light enter and one light emitting surface from which light is emitted. Accordingly, in the case of using three colors of light to be incident on the cross dichroic cube, it suffices that the projection-type image display apparatus has one cross dichroic cube.

On the other hand, for the purpose of improving color reproduction capability and luminance, there has been proposed a projection-type image display apparatus using four or more colors of light. By using, for example, orange, yellow, or cyan light in addition to three colors of red, green, and blue light, such a projection-type image display apparatus is intended to improve color reproduction capability and luminance (for instance, see Japanese Patent Publication No. 2002-287247 (Claims 1 and 4, FIG. 1, and the like)).

When light beams of four colors or more are utilized in the projection-type image display apparatus, light beams of four colors or more cannot be combined by one cross dichroic cube. For this reason, the projection-type image display apparatus should be provided with a plurality of dichroic cubes (or cross dichroic cubes).

For example, when a combination of light beams of four different colors is needed, the projection-type image display apparatus obtains two combined light beams in each of which light beams of two different colors are combined, and further combines the two combined light beams to obtain a combined light beam of four different colors. In addition, the projection-type image display apparatus may obtain a combined light beam in which light beams of three different colors are combined and combine the obtained light beam with one color light beam to obtain a combined light beam of four different colors. Moreover, the projection-type image display apparatus may obtain a combined light beam in which light beams of two different colors are combined and combine the obtained light beam with color light beams of two different colors to obtain a combined light beam of four different colors.

Here, an optical path length from each of the light valves corresponding to four or more colors to the projection mean should be the same. Moreover, there is need to provide a plurality of dichroic cubes (or cross dichroic cubes) between the light valves and the projection mean. Accordingly, the back focus of the projection mean becomes longer.

As a result, a projection mean used in a projection-type image display apparatus using light of three colors cannot be used for the one using light of four or more colors, leading to an increase in manufacturing cost of the projection-type image display apparatus as a whole.

SUMMARY OF THE INVENTION

A projection display apparatus (projection display apparatus 100) according to an aspect includes: a light source (light source 10); a light valve (liquid crystal panel 30R, liquid crystal panel 30G and liquid crystal panel 30B, for example) configured to modulate a light emitted from the light source; a light guiding member (mirrors 321, 322, 323, 324 and 325, for example) configured to divide the light emitted from the light source into a first component light (red component light R, for example), a second component light (red component light G, for example), and a third component light (red component light B, for example), and configured to guide divided light to the light valve; and a projection unit (projection lens unit 110, for example) configured to project a light modulated by the light valve. The he second component light combined with other component light enters the light valve, and the other component light is modulated with the second component light.

According to the above aspect, the other component light combined with the second light component light enters the light valve, and the light valve modulates the other component light together with the second component light. As a result, since the other component light is projected while superimposed on the second component light, luminance of the image projected on the screen etc. from the projection unit can be improved.

The projection display apparatus according to the above aspect includes: a first state (display colors are white, yellow and the other, for example) where the second component light combined with the other component light enters the light valve, and a second state (display colors are red, green and blue, for example) where the second component light enters the light valve without combined with the other component light enters the light valve.

In the above aspect, the light guiding member includes an optical element (mirror 323, for example) configured to selectively transmit or reflect the light according to a wavelength of the light. A light beam (light beam $L_1$, $L_2$ and $L_3$, for example) of the light transmitted or reflected by the optical element is transmitted or reflected at the same position (position $P_1$, $P_2$ and $P_3$, for example), when re-entering the optical element.

In the above aspect, the second component light is a green component light, and the other component light is a light (yellow component light Ye, for example) having a wavelength longer than a wavelength of the green component light.

A projection display apparatus (projection display apparatus 100) according to an aspect includes: a light source (light source 10); a light valve (liquid crystal panel 30R, liquid crystal panel 30G and liquid crystal panel 30B, for example) configured to modulate a light emitted from the light source; a light guiding member (mirrors 321, 322, 323, 324 and 325, for example) configured to divide the light emitted from the light source into a red component light, a green component light, and a blue component light, and configured to guide divided light to the light valve; and a projection unit (projection lens unit 110, for example) configured to project a light modulated by the light valve. The light guiding member includes a optical element (mirror 323, for example) configured to combine the green component light and other component light (yellow component light Ye, for example) having a wavelength longer than a wavelength of the green component light, by reflecting the green component light and transmitting the other component light. The second component light combined with other component light enters the light valve, and The other component light is modulated with the to second component light.

BRIEF DESCRIPTION OF THE DRAWINGS

FIG. 6 is a view illustrating a relationship between a color signal and a display color according to the first embodiment of the present invention;

DETAILED DESCRIPTION OF THE PREFERRED EMBODIMENTS

Figure 1:
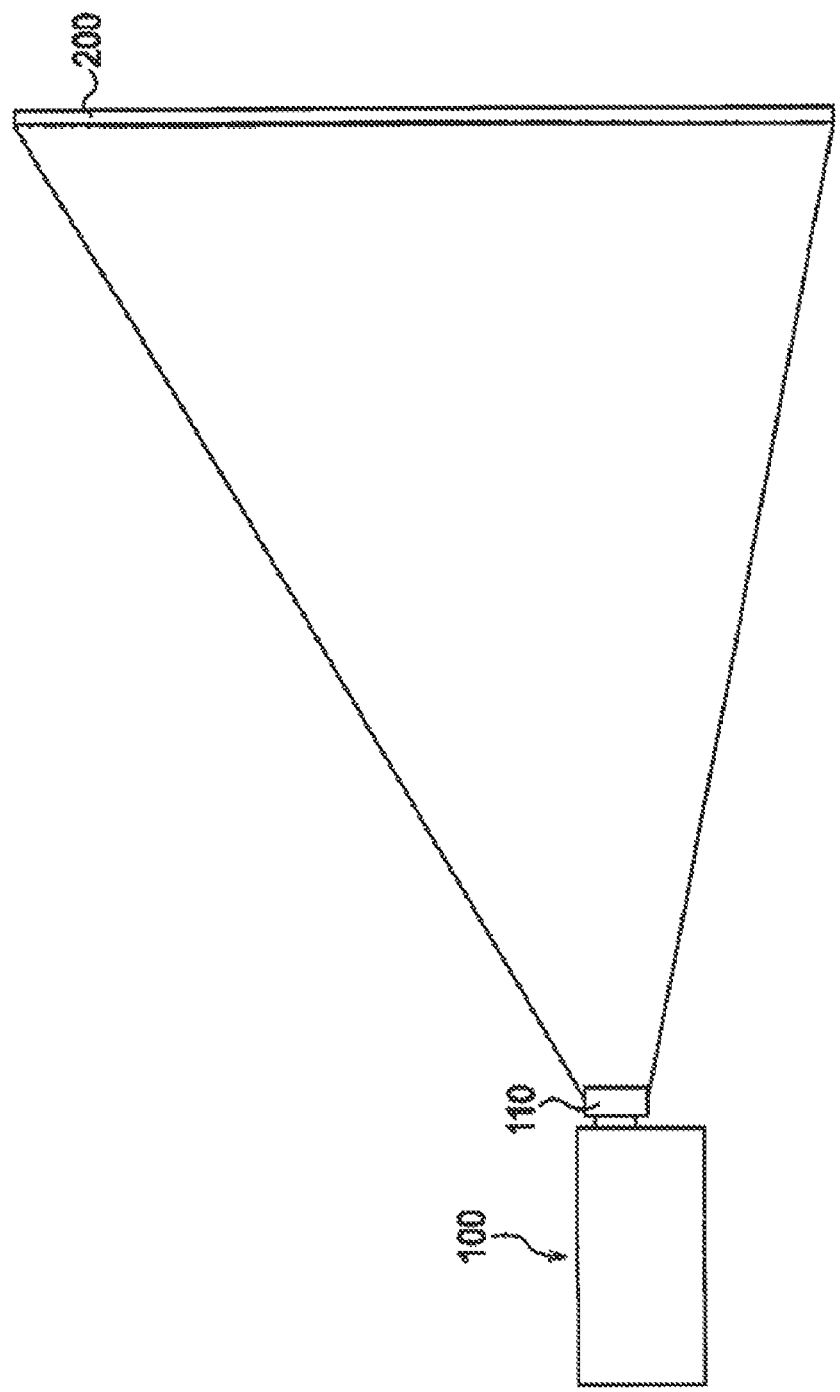
FIG. 1 is a view illustrating an outline of a projection-type image display apparatus 100 according to a first embodiment of the present invention.

A projection-type image display unit according to each embodiment of the present invention will be described below by referring to the drawings. Note that same or similar reference numerals denote same or similar portions in the drawings.

Note that the drawings are merely schematic and proportions of sizes and the like are different from actual ones. Thus, specific sizes and the like should be determined by referring to the description below. In addition, needless to say, portions are included where relationships or proportions of sizes of the drawings differ among the drawings.

First Embodiment (Outline of Projection-Type Image Display Apparatus)

The following will explain the outline of a projection-type image display apparatus according to a first embodiment of the present invention with reference to drawings. FIG. 1 is a view illustrating the outline of a projection-type image display apparatus 100 according to the first embodiment of the present invention.

As illustrated in FIG. 1, the projection-type image display apparatus 100 has a projection lens unit 110 and projects image light enlarged by the projection lens unit 110 on a screen 200. The projection-type image display apparatus 100 utilizes yellow component light as fourth color component light in addition to red component light, green component light and blue component light as described later.

(Schematic Configuration of Illumination Unit)

Figure 2:
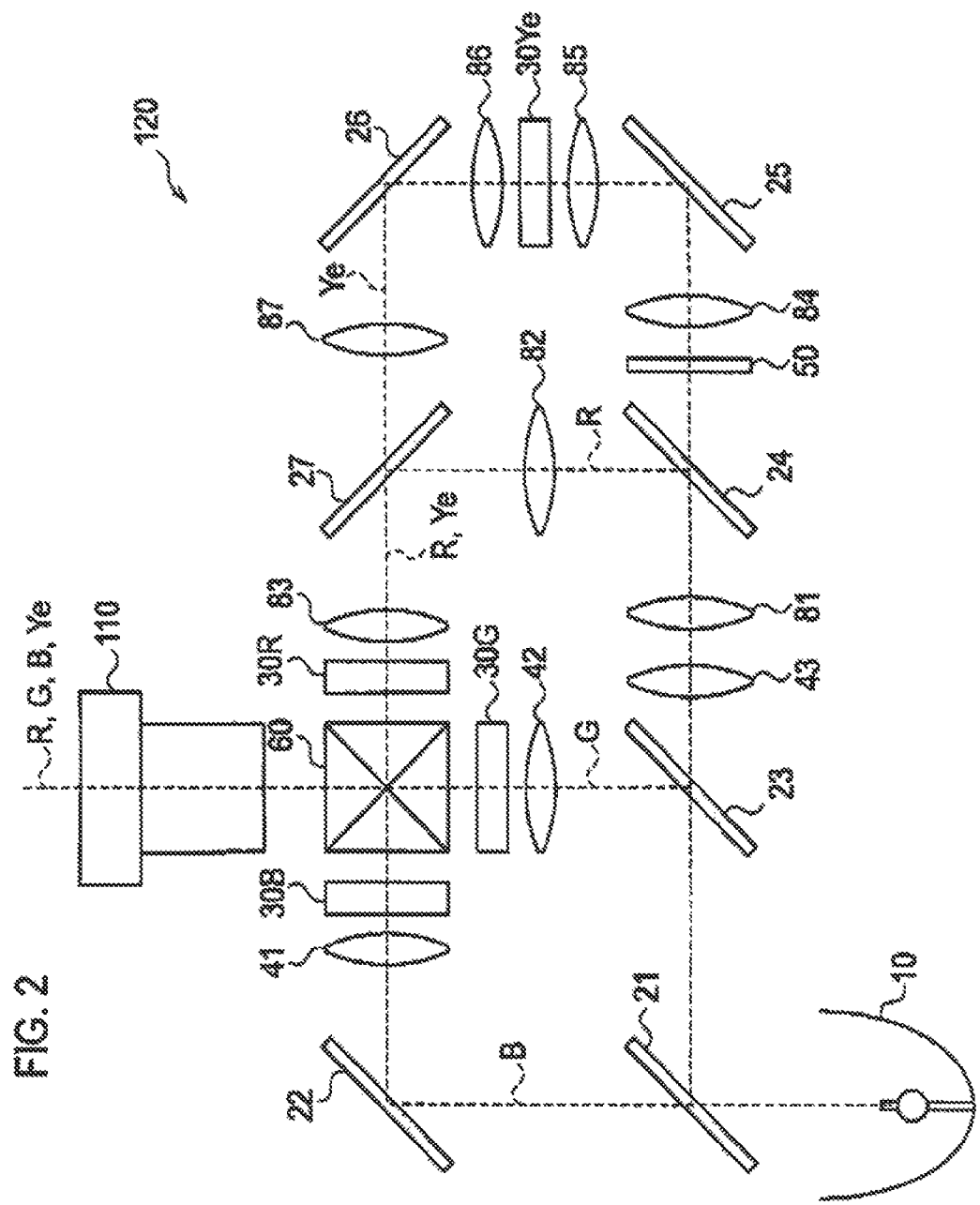
FIG. 2 is a view illustrating a schematic configuration of an illumination unit 120 according to the first embodiment of the present invention.

The following will explain the schematic configuration of an illumination unit according to the first embodiment of the present invention with reference to the drawings. FIG. 2 is a view illustrating a schematic configuration of an illumination unit 120 according to the first embodiment of the present invention. It should be noted that FIG. 2 omits a fly-eye lens that homogenizes light beams emitted by a light source 10, a Polarized Beam Splitter (PBS) that aligns polarization directions of light beams emitted by the light source 10, and the like.

As illustrated in FIG. 2, the illumination unit 120 includes the light source 10, a plurality of liquid crystal panels 30 (liquid crystal panel 30R, liquid crystal panel 30G, liquid crystal panel 30B and liquid crystal panel 30Ye) and a cross dichroic cube 60. Additionally, it should be noted that the projection unit 110 is not included in the illumination unit 120 though it is illustrated in FIG. 2.

The light source 10 is a UHP lamp that emits white light, or the like. In other words, light emitted by the light source 10 includes at least red component light, green component light, blue component light and yellow component light.

Figure 3:
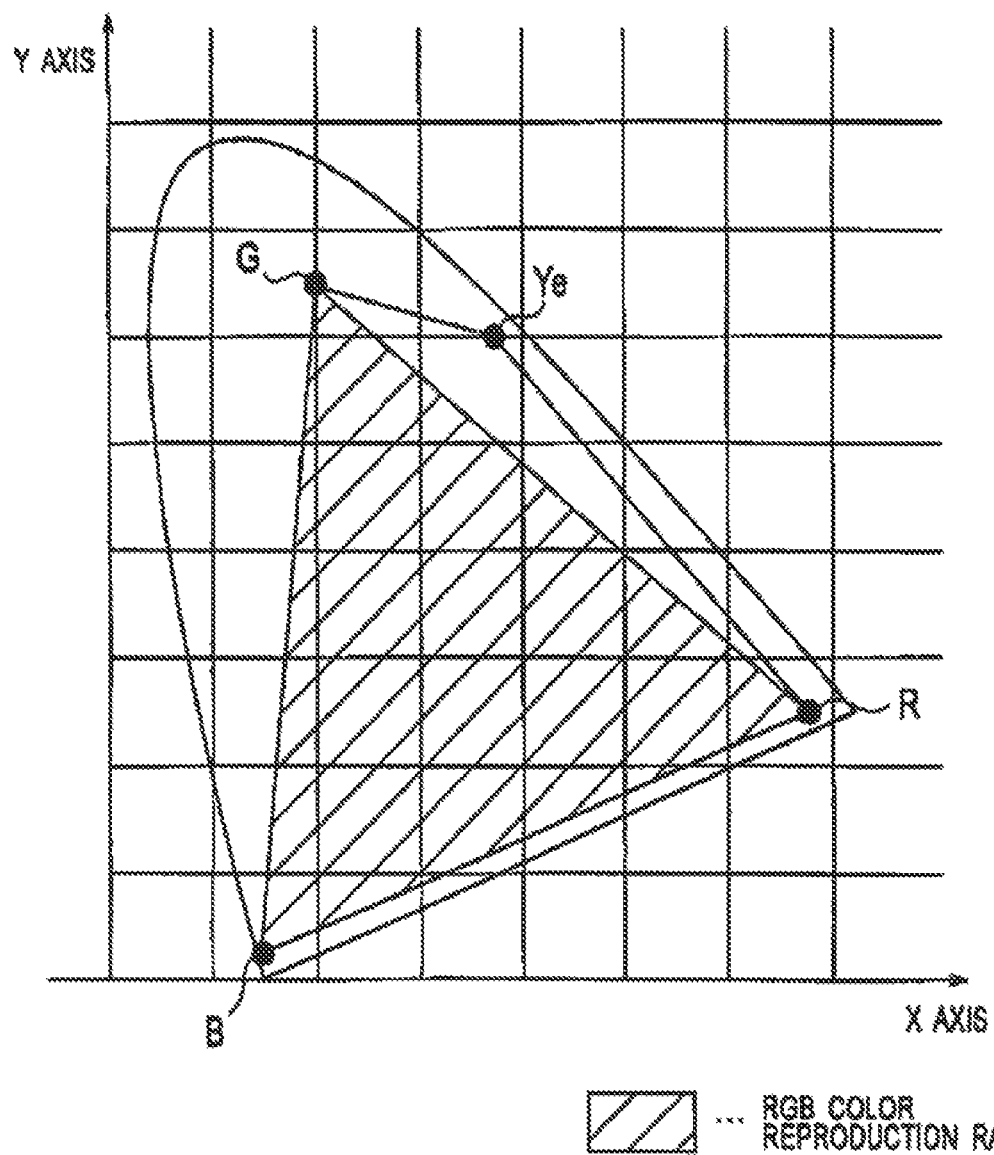
FIG. 3 is a view illustrating an RGB color reproduction range according to the first embodiment of the present invention.

Herein, the yellow component light refers to light that can reproduce color that is out of a reproducible color range (RGB color reproducible range) of red component light, green component light and blue component light as illustrated in FIG. 3. In a projection-type image display apparatus using light beams of three colors, the yellow component light is light that is removed in the process of color separation.

The liquid crystal panel 30R modulates red component light according to a red input signal as described later. In addition, a pair of polarizing plates (not shown) is provided on a light incident side and a light emitting side of the liquid crystal panel 30R.

Likewise, the liquid crystal panel 30G modulates green component light according to a green input signal and the liquid crystal panel 30B modulates blue component light according to a blue input signal. In addition, a pair of polarizing plates (not shown) is provided on a light incident side and a light emitting side of each of the liquid crystal panel 30G and the liquid crystal panel 30B.

Meanwhile, the liquid crystal panel 30Ye modulates yellow component light according to an amount of modulation (yellow signal) controlled according to contribution calculated based on the red input signal, green input signal and blue input signal. In addition, a polarizing plate (not shown) may be provided on at least one of the light incident side or the light emitting side of the liquid crystal panel 30Ye.

Light emitted from the liquid crystal panel 30Ye enters on the liquid crystal panel 30R (a certain light valve). In other words, the liquid crystal panel 30R is provided on an optical path of light after being emitted from the liquid crystal panel 30Ye before entering the cross dichroic cube 60.

It should be noted that control of the amount of modulation of the liquid crystal panel 30Ye refers to control of an amount of yellow component light transmitted through the liquid crystal panel 30Ye.

It is preferable that light emitted from the liquid crystal panel 30Ye approximately form an image on the liquid crystal panel 30R. For example, relay lenses (lens 86, lens 87, and lens 83) are provided on the optical path of the light emitted from the liquid crystal panel 30Ye between the liquid crystal panel 30Ye and the liquid crystal panel 30R, thereby making it possible for light emitted from the liquid crystal panel 30Ye to approximately form an image on the liquid crystal panel 30R. Herein, it should be noted that approximate image forming is a concept including full image forming.

Figure 4A:
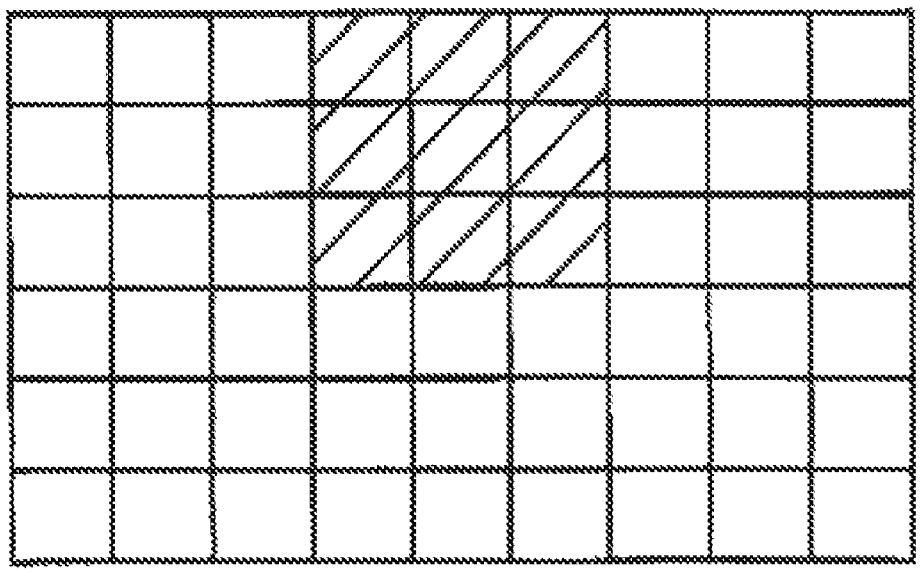
FIGS. 4A and 4B are image view illustrating example of resolution of a liquid crystal panel according to the first embodiment of the present invention.
Figure 4B:
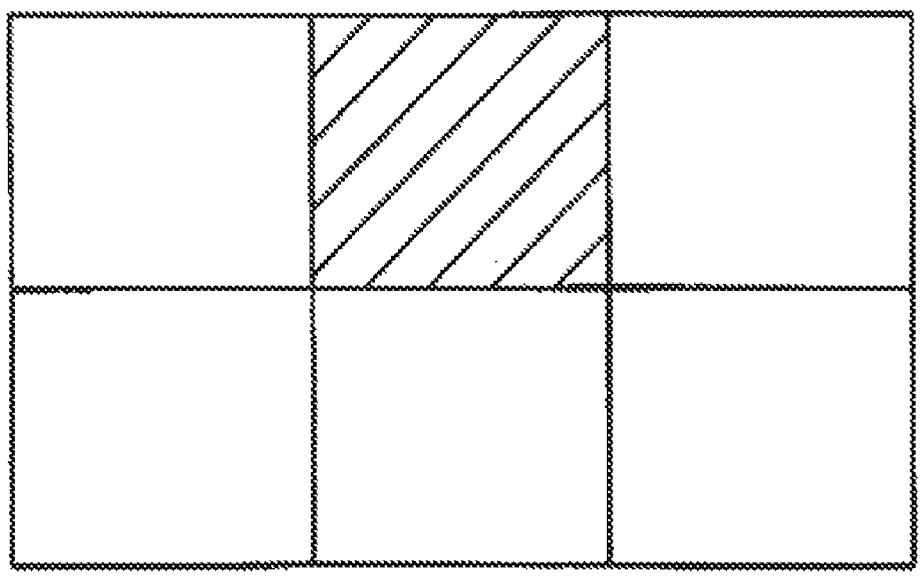

Herein, resolution of the liquid crystal panel 30Ye is different from those of the liquid crystal panel 30R, the liquid crystal panel 30G and the liquid crystal panel 30B. FIG. 4A is an image view illustrating one example of resolution of the liquid crystal panel 30R, the liquid crystal panel 30G and the liquid crystal panel 30B. FIG. 4B is an image view illustrating one example of resolution of the liquid crystal panel 30Ye. As illustrated in FIGS. 4A and 4B, each of the liquid crystal panel 30R, the liquid crystal panel 30G and the liquid crystal panel 30B has a high resolution in order to display a high definition image on the screen 200. Meanwhile, the light emitted from the liquid crystal panel 30Ye is used mainly as illumination light. Accordingly, it is preferable that a resolution of the liquid crystal panel 30Ye be lower than those of the liquid crystal panel 30R, the liquid crystal panel 30G and the liquid crystal panel 30B in order to prevent a decrease in to utilization efficiency of light due to electrodes provided on the liquid crystal panel. Moreover, it is sufficient that the resolution of the liquid crystal panel 30Ye is low since the amount of yellow component light may be adjusted for each target region.

It should be noted that a low resolution is a concept that includes a state where the liquid crystal panel 30Ye has no resolution. Accordingly, the liquid crystal panel 30Ye does not have to be configured such that the amount of modulation is controllable for each of the plurality of regions and may have a configuration such that only the amount of modulation of the entire surface is controlled.

Moreover, the resolution of the liquid crystal panel 30Ye may be the same as those of the liquid crystal panel 30R, the liquid crystal panel 30G and the liquid crystal panel 30B.

The cross dichroic cube 60 combines light emitted from each of the liquid crystal panel 30R, the liquid crystal panel 30G and the liquid crystal panel 30B. In other words, the cross dichroic cube 60 combines red component light and yellow component light emitted from the liquid crystal panel 30R, green component light emitted from the liquid crystal panel 30G and blue component light emitted from the liquid crystal panel 30B. Furthermore, the cross dichroic cube 60 emits the combined light (image light) including red component light, green component light, blue component light and yellow component light toward the projection lens unit 110.

The projection lens unit 110 projects the combined light (image light) combined by the cross dichroic cube 60 on screen 200 as mentioned above.

Referring back to FIG. 2, the illumination unit 120 has a plurality of mirror groups (mirrors 21 to 27). The mirror 21 is a dichroic mirror that transmits blue component light and reflects other light including red component light, green component light and yellow component light. The mirror 22 is a mirror that reflects blue component light on the liquid crystal panel 30B side. The mirror 23 is a dichroic mirror that reflects green component light on the liquid crystal panel 30G side and transmits other light including red component light and yellow component light. The mirror 24 is a dichroic mirror that reflects red component light on the liquid crystal panel 30R side and transmits other light including yellow component light. The mirror 25 is a mirror that reflects yellow component light on the liquid crystal panel 30Ye side. The mirror 26 is a mirror that reflects yellow component light on the liquid crystal panel 30R side. The mirror 27 is a dichroic mirror that transmits yellow component light emitted from the liquid crystal panel 30Ye and reflects red component light on the liquid crystal panel 30R side.

Herein, the mirror 21, the mirror 23 and the mirror 24 form a color separator configured to separate light emitted from the light source 10 into red component light, green component light, blue component light and yellow component light.

The illumination unit 120 has a plurality of lens groups (lenses 41 to 43 and lenses 81 to 87). The lens 41 is a condenser lens that collimates blue component light reflected by the mirror 22 so that the liquid crystal panel 30B is irradiated with blue component light. The lens 42 is a condenser lens that collimates green component light reflected by the mirror 23 so that the liquid crystal panel 30G is irradiated with green component light. The lens 43 is a condenser lens that collimates red component light transmitted through the mirror 23 so that the liquid crystal panel 30R is irradiated with red component light. Likewise, the lens 43 is a condenser lens that collimates yellow component light transmitted through the mirror 23 so that the liquid crystal panel 30Ye is irradiated with yellow component light.

The lenses 81 to 83 are relay lenses that cause red component light, collimated by the lens 43, to approximately form an image on the liquid crystal panel 30R. The lenses 81, 84 and 85 are relay lenses that cause yellow component light, collimated by the lens 43, to approximately form an image on the liquid crystal panel 30Ye. The lenses 86, 87 and 83 are relay lenses that cause yellow component light to approximately form an image on the liquid crystal panel 30R while controlling expansion of yellow component light emitted from the liquid crystal panel 30Ye.

The illumination unit 120 has a wave plate 50 that rotates a polarization direction of yellow component light by 90 degrees. More specifically, the wave plate 50 rotates the polarization direction of yellow component light, which is the same as that of red component light, by substantially 90 degrees to emit yellow component light to the liquid crystal panel 30R side.

Here, when the polarization direction of yellow component light emitted from the liquid crystal panel 30Ye is different from that of red component light entering the liquid crystal panel 30R, yellow component light is shielded by a polarizing plate provided on the light incident side of the to liquid crystal panel 30R.

Accordingly, as to whether or not voltage should be applied to the liquid crystal panel 30Ye, it is controlled based on a relationship between a voltage-applied condition and a rotation of polarized light. The following will explain examples including first and second types of liquid crystal panels. Specifically, the first type liquid crystal panel is configured to rotate the polarization direction with no voltage applied thereto and not to rotate the polarization direction with voltage applied thereto. Moreover, the second type liquid crystal panel is configured not to rotate the polarization direction with no voltage applied thereto and to rotate the polarization direction with voltage applied thereto.

(1) Case Where Liquid Crystal Panel 30Ye is the First Type
(1-1) Case Where Wave Plate 50 is not Provided In order to turn off yellow component light, no voltage is applied to the liquid crystal panel 30Ye. As a result, the liquid crystal panel 30Ye rotates the polarization direction of yellow component light, so that the polarization direction of yellow component light is different from that of red component light. In other words, yellow component light is shielded by the polarizing plate provided on the light incident side of the liquid crystal panel 30R.

In order to turn on yellow component light, voltage is applied to the liquid crystal panel 30Ye. As a result, the liquid crystal panel 30Ye does not rotate the polarization direction of yellow component light, so that the polarization direction of yellow component light is the same as that of red component light.

(1-2) Case Where Wave Plate 50 is Provided

In order to turn off yellow component light, voltage is applied to the liquid crystal panel 30Ye. As a result, the liquid crystal panel 30Ye does not rotate the polarization direction of yellow component light after the wave plate 50 rotates the polarization direction of yellow component light, so that the polarization direction of yellow component light is different from that of red component light. In other words, yellow component light is shielded by the polarizing plate provided on the light incident side of the liquid crystal panel 30R.

In order to turn on yellow component light, no voltage is applied to the liquid crystal panel 30Ye. As a result, the liquid crystal panel 30Ye further rotates the polarization direction of yellow component light after the wave plate 50 rotates the polarization direction of yellow component light, so that the polarization direction of yellow component light is the same as that of red component light.

(2) Case Where Liquid Crystal Panel 30Ye is a Second Type
(2-1) Case Where Wave Plate 50 is not Provided In order to turn off yellow component light, voltage is applied to the liquid crystal panel 30Ye. As a result, the liquid crystal panel 30Ye rotates the polarization direction of yellow component light, so that the polarization direction of yellow component light is different from that of red component light. In other words, yellow component light is shielded by the polarizing plate provided on the light incident side of the liquid crystal panel 30R.

In order to turn on yellow component light, voltage is not applied to the liquid crystal panel 30Ye. As a result, the liquid crystal panel 30Ye does not rotate the polarization direction of yellow component light, so that the polarization direction of yellow component light is the same as that of red component light.

(2-2) Case Where Wave Plate 50 is Provided

In order to turn off yellow component light, no voltage is applied to the liquid crystal panel 30Ye. As a result, the liquid crystal panel 30Ye does not rotate the polarization direction of yellow component light after the wave plate 50 rotates the polarization direction of yellow component light, so that the polarization direction of yellow component light is different from that of red component light. In other words, yellow component light is shielded by the polarizing plate provided on the light incident side of the liquid crystal panel 30R.

In order to turn on yellow component light, voltage is applied to the liquid crystal panel 30Ye. As a result, the liquid crystal panel 30Ye further rotates the polarization direction of yellow component light after the wave plate 50 rotates the polarization direction of yellow component light, so that the polarization direction of yellow component light becomes the same as that of red component light.

TABLE 1

| MIRROR 24 POLARIZAION DIRECTION OF YELLOW COMPONENT YE (EMISSION) | NARROW BAND VAVE PLATE 50 EXISTS OR NOT | NARROW BAND VAVE PLATE 50 POLARIZAION DIRECTION OF YELLOW COMPONENT YE (EMISSION) | LIQUID CRYSTAL PANEL 30Ye VOLTAGE | LIQUID CRYSTAL PANEL 30Ye POLARIZAION DIRECTION OF YELLOW COMPONENT YE (EMISSION) | LIQUID CRYSTAL PANEL 30R POLARIZAION DIRECTION OF YELLOW COMPONENT YE (INCIDENT) | ON/OFF |
|---|---|---|---|---|---|---|
| | | LIQUID CRYSTAL PANEL 30YE = FIRST TYPE | | | | |
| = RED LIGHT COMPONENT R | EXISTS | ≠ RED LIGHT COMPONENT R | ON | ≠ RED LIGHT COMPONENT R | ≠ RED LIGHT COMPONENT R | OFF |
| | EXISTS | ≠ RED LIGHT COMPONENT R | OFF | = RED LIGHT COMPONENT R | = RED LIGHT COMPONENT R | ON |
| | NOT | = RED LIGHT COMPONENT R | OFF | = RED LIGHT COMPONENT R | = RED LIGHT COMPONENT R | ON |
| | NOT | = RED LIGHT COMPONENT R | ON | ≠ RED LIGHT COMPONENT R | ≠ RED LIGHT COMPONENT R | OFF |
| | | LIQUID CRYSTAL PANEL 30YE = SECOND TYPE | | | | |
| = RED LIGHT COMPONENT R | EXISTS | ≠ RED LIGHT COMPONENT R | ON | = RED LIGHT COMPONENT R | = RED LIGHT COMPONENT R | ON |
| | EXISTS | ≠ RED LIGHT COMPONENT R | OFF | ≠ RED LIGHT COMPONENT R | ≠ RED LIGHT COMPONENT R | OFF |
| | NOT | = RED LIGHT COMPONENT R | OFF | ≠ RED LIGHT COMPONENT R | ≠ RED LIGHT COMPONENT R | OFF |
| | NOT | = RED LIGHT | ON | = RED LIGHT | = RED LIGHT | ON |

TABLE 1-continued

| MIRROR 24 | | NARROW BAND VAVE PLATE 50 | | LIQUID CRYSTAL PANEL 30Ye | LIQUID CRYSTAL PANEL 30R | |
|---|---|---|---|---|---|---|
| POLARIZAION DIRECTION OF YELLOW COMPONENT YE (EMISSION) | EXISTS OR NOT | POLARIZAION DIRECTION OF YELLOW COMPONENT YE (EMISSION) | VOLTAGE | POLARIZAION DIRECTION OF YELLOW COMPONENT YE (EMISSION) | POLARIZAION DIRECTION OF YELLOW COMPONENT YE (INCIDENT) | ON/OFF |
| | | COMPONENT R | | COMPONENT R | COMPONENT R | |

Here, table 1 shows a relationship between the aforementioned voltage-applied condition and rotation of the polarized light.

(Functions of Projection-Type Image Display Apparatus)

Figure 5:
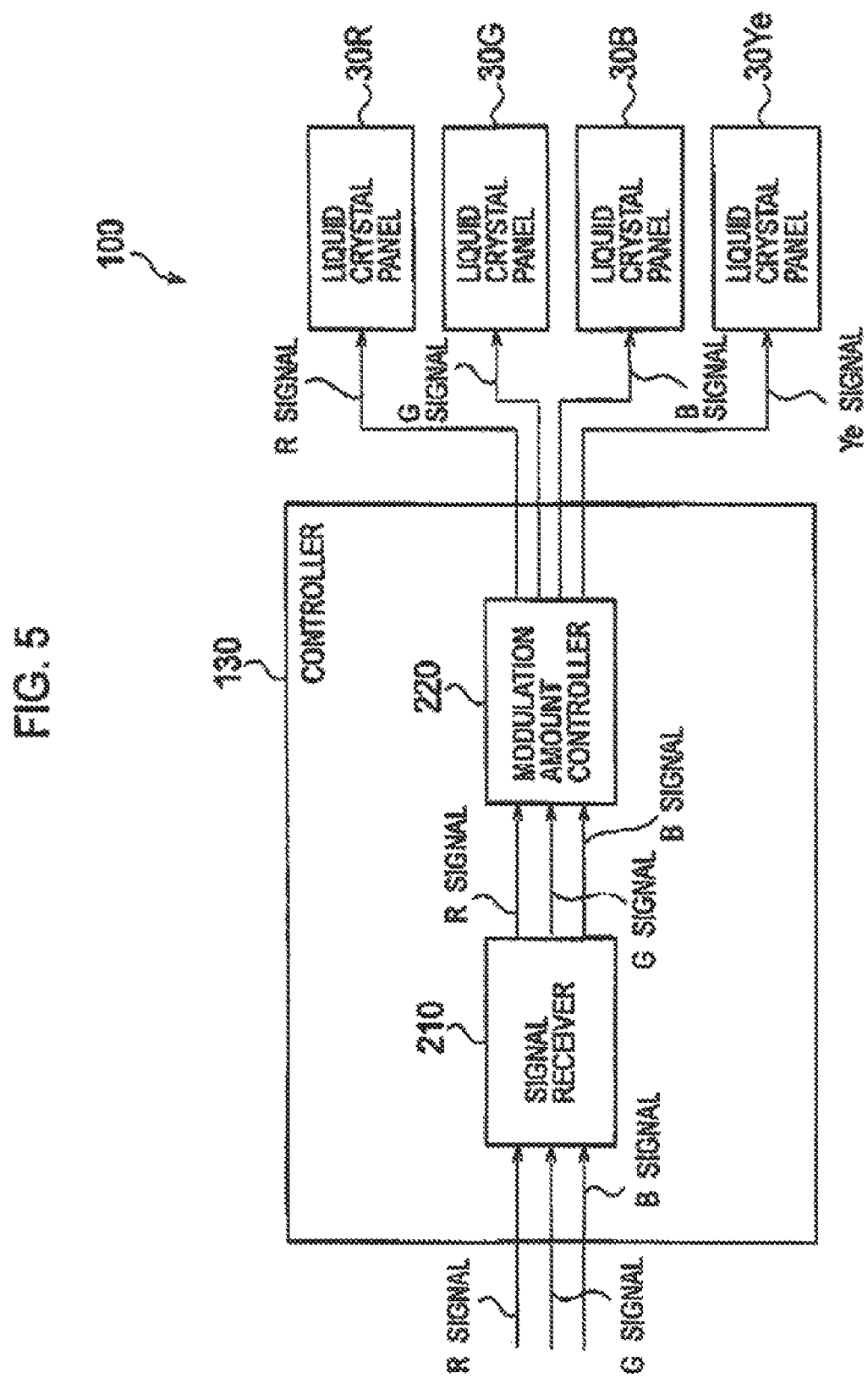
FIG. 5 is a block diagram illustrating functions of the projection-type image display apparatus 100 according to the first embodiment of the present invention.

The following will explain the functions of the projection-type image display apparatus according to the first embodiment with reference to the drawings. FIG. 5 is a block diagram illustrating the functions of the projection-type image display apparatus 100 according to the first embodiment.

The projection-type image display apparatus 100 includes a controller 130 including a signal receiver 210 and a modulation amount controller 220.

The signal receiver 210 is configured to receive the respective color signals (a red input signal, a green input signal and a blue input signal). For example, the signal receiver 210 obtains each color signal from a color separation block that separates a color signal from an image signal.

The modulation amount controller 220 is configured to control an amount of modulation of each liquid crystal panels 30 (a liquid crystal panel 30R, a liquid crystal panel 30C, a liquid crystal panel 30B and a liquid crystal panel 30Ye) based on each color signal obtained from the signal receiver 210.

More specifically, the modulation amount controller 220 inputs a red input signal without any modulation added thereto to the liquid crystal panel 30R. Likewise, the modulation amount controller 220 inputs a green input signal without any modulation to the liquid crystal panel 30G and inputs a blue input signal without any modulation to the liquid crystal panel 30G. On the other hand, the modulation amount controller 220 calculates contribution of yellow component light based on the red input signal, the green input signal and the blue input signal and generates a yellow signal to be inputted to the liquid crystal panel 30Ye.

Here, the modulation amount controller 220 calculates a luminance representative value for each target region, based on each of the red input signal, the green input signal and the blue input signal. The luminance representative value includes a luminance minimum value, a luminance maximum value, a luminance average value and the like. Sequentially, the modulation amount controller 220 decides an amount of superimposition of yellow component light for an image according to the luminance representative value and controls the amount of modulation (namely, value of yellow signal) of the liquid crystal panel 30Ye.

For example, assume a case where each color signal is represented by an eight-bit sequence. When the luminance representative value is 255, a value of the yellow signal is a maximum value (namely, 255). On the other hand, when the luminance representative value is 128, the value of the yellow signal is a half of the maximum value (namely, 128).

Accordingly, when an image displayed on the screen 200 is black, the luminance representative value is 0, and the value of the yellow signal is also 0. On the other hand, when an image displayed on the screen 200 is white, the luminance representative value is 255, and the value of the yellow signal is also 255. As a result, when the image displayed on the screen 200 is white, light emitted from the liquid crystal panel 30Ye is added to light emitted from the liquid crystal panel 30R, so that the luminance of the image displayed on the screen 200 is improved.

The aforementioned target regions refer to those formed on the liquid crystal panel 30Ye according to resolution of the liquid crystal panel 30Ye. Namely, on the liquid crystal panel 30R, the target regions are those with which light emitted from the liquid crystal panel 30Ye is irradiated. The size of each target region is changeable according to an accuracy of an adjustment of a luminance of the image displayed on the screen 200. The changing of size of the target region may be made with hardware, such as replacement of liquid crystal panel 30Ye or with software, such as a change in control of the liquid crystal panel 30Ye.

In addition, when the value of the yellow signal is individually decided between one target region and another target region adjacent to the one target region, causing deterioration in luminance balance of the image displayed on the screen 200, the value of the yellow signal of the one target region is preferably decided with consideration given to the value of the yellow signal of the other target region.

An explanation will be next given of a relationship between the color of the image displayed on the target region and the color component light for use in reproducing the image displayed on the target region.

More specifically, the amount of each color component light (that is, the amount of modulation of each liquid crystal panel 30) is controlled according to the color of the image displayed on the target region. When the image displayed on the target region is white as illustrated in FIG. 6, all of red component light, green component light, blue component light and yellow component light are utilized. When the image displayed on the target region is black, none of red component light, green component light, blue component light or yellow component light is utilized.

When the image displayed on the target region is red, only the red component light is utilized. Likewise, when the image displayed on the target region is green, only the green component light is utilized, and when the image displayed on the target region is blue, only the blue component light is utilized.

When the image displayed on the entire surface of the target region is yellow, it is impossible to utilize only yellow component light since yellow component light enters the liquid crystal panel 30R. Accordingly, red component light and green component light are utilized instead of yellow component light in order to prevent the red color from being mixed in the yellow color. Incidentally, yellow component light may be utilized as a matter of course, if the usage is within a range that the yellow color balance can be maintained.

(Function and Effect)

According to the projection-type image display apparatus 100 of the first embodiment, yellow component light (the fourth color component light) emitted from the liquid crystal panel 30Ye enters on the liquid crystal panel 30R. Namely, yellow component light is superimposed on red component light and the resultant light is supplied to the cross dichroic cube 60. Accordingly, even when yellow component light is utilized in addition to red component light, green component light and blue component light, light to enter the cross dichroic cube 60 includes three types (light including red component light and yellow component light, green component light and blue component light). As a result, there is no need to change design of the projection lens unit 110, making it possible to suppress an increase in manufacturing cost of the entire apparatus.

Moreover, yellow component light is superimposed on red component light and the resultant light is supplied to the cross dichroic cube 60, resulting in improvement of luminance of the image projected on the screen 200 by the projection lens unit 110.

According to the projection-type image display apparatus 100 of the first embodiment, the resolution of the liquid crystal panel 30Ye is lower than those of the liquid crystal panel 30R, the liquid crystal panel 30G and liquid crystal panel 30B. Accordingly, a decrease in utilization efficiency of yellow component light due to electrodes provided on the liquid crystal panel 30Ye can be suppressed, resulting in an increase in utilization efficiency of yellow component light to be utilized as illumination light.

According to the projection-type image display apparatus 100 of the first embodiment, the yellow signal (an amount of modulation of liquid crystal panel 30Ye) is controlled based on the red input signal, the green input signal and the blue input signal. Consequently, it is possible to improve luminance of the image appropriately without losing the color balance of the image projected on the screen 200.

According to the projection-type image display apparatus 100 of the first embodiment, yellow component light whose amount of light is controlled for each target region approximately forms an image on the liquid crystal panel 30R. Thus, it is possible to appropriately improve luminance of the entire image projected on the screen 200.

According to the projection-type image display apparatus 100 of the first embodiment, since yellow component light enters on the liquid crystal panel 30R that modulates red component light, it is possible to increase the life time of the liquid crystal panel and the polarizing plate, as compared with the case in which yellow component light enters on another liquid crystal panel. Additionally, in order to increase the lifetime of the liquid crystal panel and the polarizing plate, cooling power of apparatuses (a liquid cooling apparatus and an air cooling apparatus) that cools these elements may be strengthened.

Here, note that the lifetime of liquid crystal panel 30B may be shortened when yellow component light enters on the liquid crystal panel 30B in addition to blue component light, since energy of blue component light is generally high. Also, note that the lifetime of liquid crystal panel 30G may be shortened when yellow component light enters on the liquid crystal panel 30G in addition to green component light, since the light amount (calorific value) of green component light is generally high.

According to the projection-type image display apparatus 100 of the first embodiment, the illumination unit 120 has a configuration in which lenses 84 to 87, liquid crystal panel 30Ye and wave plate 50 are added to the general configuration of a three-plate projection-type image display apparatus. In other words, since a configuration similar to the three-plate projection-type image display apparatus can be employed, an optical design load of the illumination unit 120 can be reduced.

Second Embodiment

The following will explain a second embodiment with reference to the drawing. In addition, the following will explain mainly the difference between the aforementioned first and second embodiments.

More specifically, in the aforementioned first embodiment, the wave plate 50 is provided on the optical path of yellow component light before the light enters the liquid crystal panel 30Ye. On the contrary, in the second to embodiment, the wave plate 50 is provided on the optical path of yellow component light after the light is emitted from the liquid crystal panel 30Ye.

(Schematic Configuration of Illumination Unit)

Figure 7:
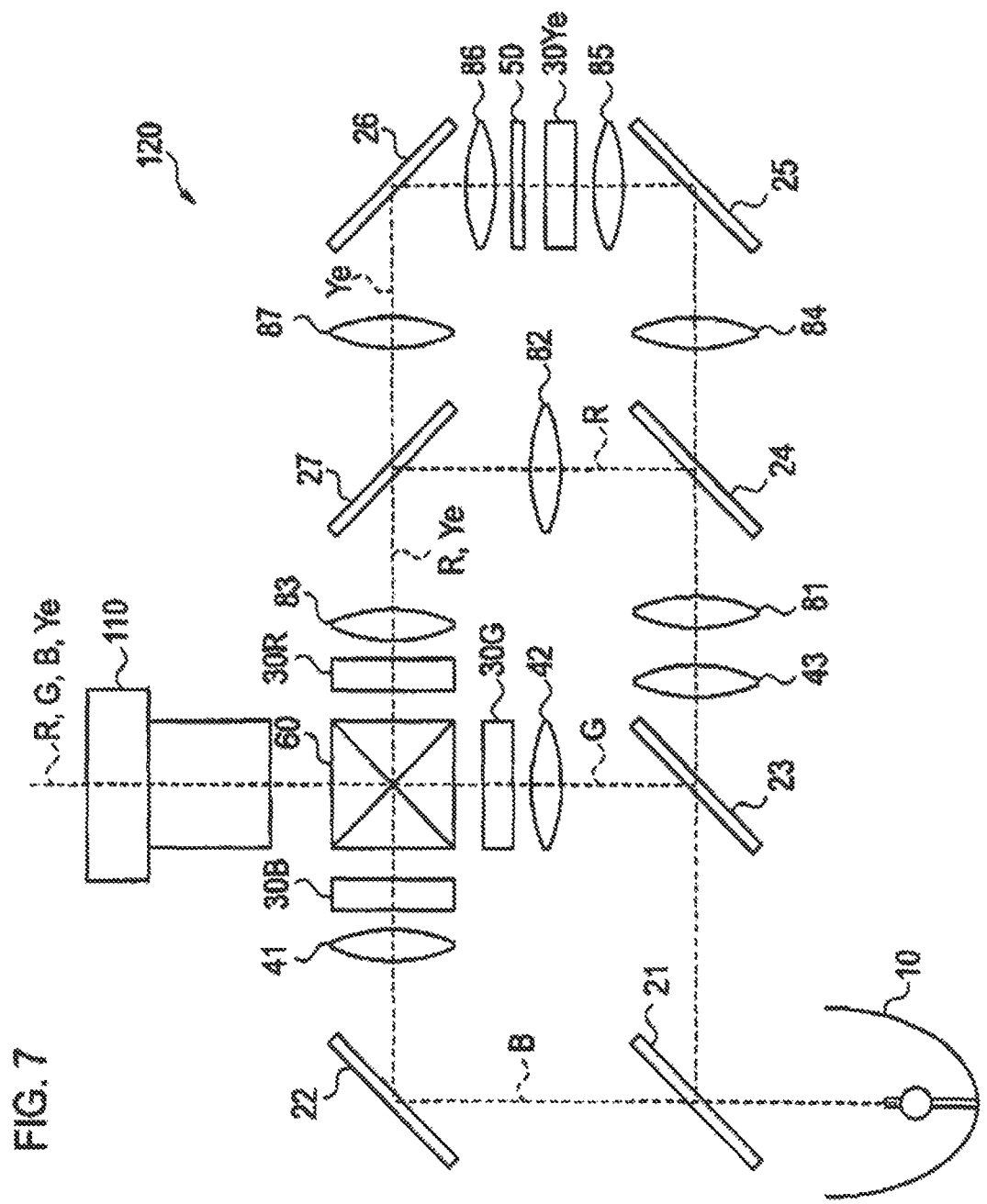
FIG. 7 is a view illustrating a schematic configuration of an illumination unit 120 according to a second embodiment of the present invention.

The following will explain the schematic configuration of the illumination unit according to the second embodiment with reference to the drawing. FIG. 7 is a view illustrating the schematic configuration of the illumination unit 120 according to the second embodiment. Additionally, it is to be noted that parts in FIG. 7 identical to those in FIG. 2 are assigned the same reference numerals as those in FIG. 2.

As shown in FIG. 7, the wave plate 50 is provided on the side from which yellow component light is emitted, of the liquid crystal panel 30Ye. It is preferable that the wave plate 50 is provided close to the liquid crystal panel 30Ye.

Here, when the polarization direction of yellow component light, which is the same as that of red component light, is rotated by 90 degrees by the liquid crystal panel 30Ye before being emitted from the liquid crystal panel 30Ye, the wave plate rotates the polarization direction of yellow component light by 90 degrees. The polarization direction of yellow component light thus rotated by 90 degrees by the liquid crystal panel 30Ye is further rotated by 90 degrees, by the wave plate 50. In other words, the wave plate 50 returns the polarization direction of yellow component light to the original polarization direction to align the polarization direction of yellow component light to those of red component light, green component light and blue component light.

Third Embodiment

The following will explain a third embodiment with reference to the drawing. The following will explain mainly the difference between the aforementioned first and third embodiments.

More specifically, in the aforementioned first embodiment, yellow component light emitted from the liquid crystal panel 30Ye enters on the liquid crystal panel 30R. On the contrary, in the third embodiment, yellow component light emitted from the liquid crystal panel 30Ye enters on the liquid crystal panel 30G (a certain light valve).

(Schematic Configuration of Illumination Unit)

Figure 8:
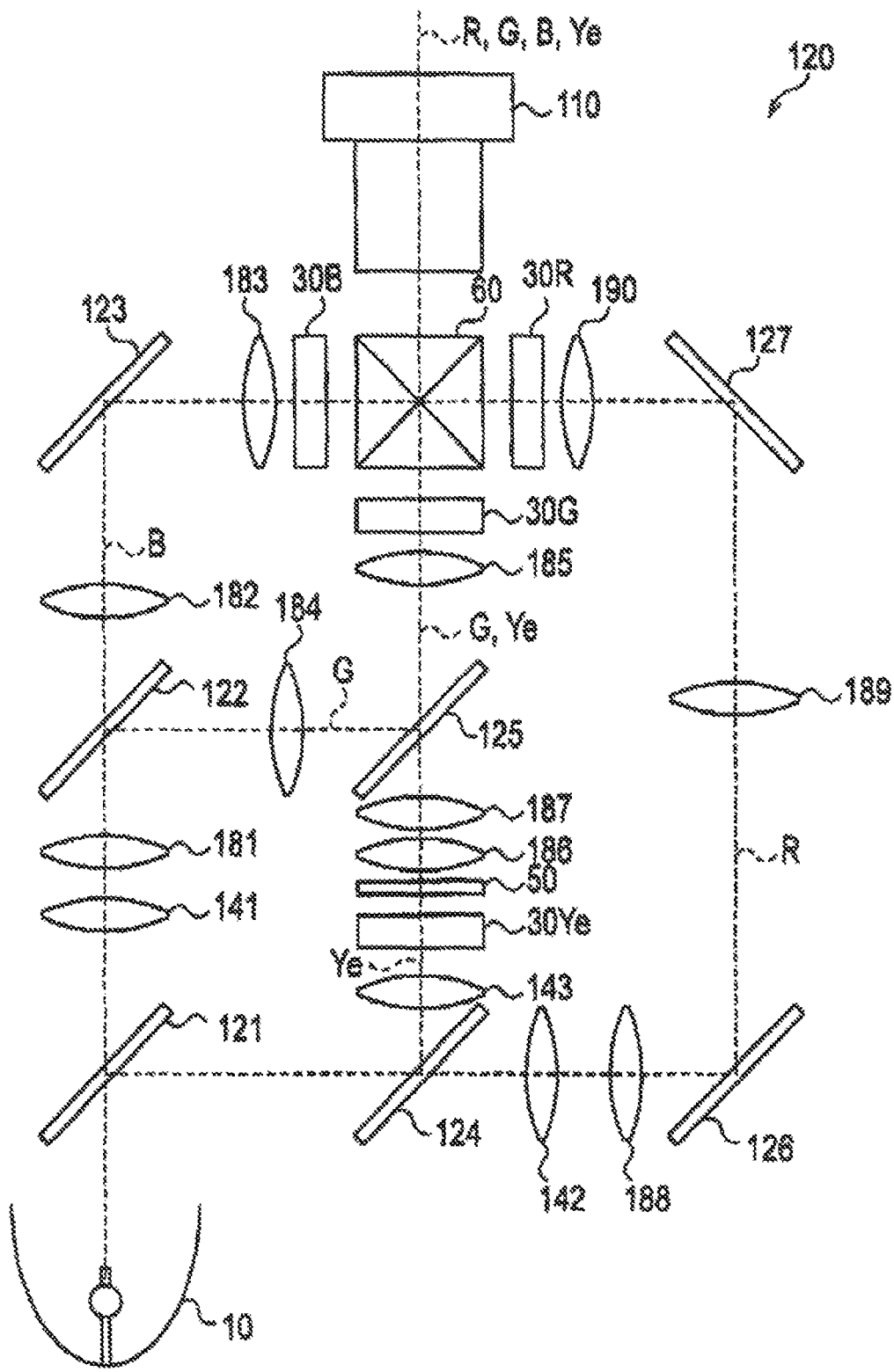
FIG. 8 is a view illustrating a schematic configuration of an illumination unit 120 according to a third embodiment of the present invention.

The following will explain the schematic configuration of the illumination unit according to the third embodiment with reference to the to drawing. FIG. 8 is a view illustrating the schematic configuration of the illumination unit 120 according to the third embodiment. Additionally, it should be noted that parts in FIG. 8 identical to those in FIG. 2 are assigned the same reference numerals as those in FIG. 2.

As illustrated in FIG. 8, the illumination unit 120 has a plurality of mirror groups (mirrors 121 to 127). The mirror 121 is a dichroic mirror that transmits blue component light and green component light and reflects other light including red component light and yellow component light. The mirror 122 is a dichroic mirror that transmits blue component light and reflects green component light. The mirror 123 is a mirror that reflects blue component light on the liquid crystal panel 30B side. The mirror 124 is a dichroic mirror that reflects yellow component light on the liquid crystal panel 30Ye side and transmits red component light. The mirror 125 is a dichroic mirror that transmits yellow component light emitted from the liquid crystal panel 30Ye and reflects green component light reflected by the mirror 122, on the liquid crystal panel 30G side. The mirror 126 and the mirror 127 are mirrors that reflect and guide red component light to the liquid crystal panel 30R side.

Herein, the mirror 121, the mirror 122 and the mirror 124 form a color separator configured to separate light emitted from the light source 10 into red component light, green component light, blue component light, and yellow component light.

Thus, in the second embodiment, yellow component light emitted from the liquid crystal panel 30Ye enters on the liquid crystal 30G.

The illumination unit 120 has a plurality of lens groups (lenses 141 to 143 and lenses 181 to 190). The lenses 141 and 142 are condenser lenses that collimate red component light, green component light and blue component light so that the respective liquid crystal panels 30 are irradiated with corresponding one of red component light, green component light and blue component light. The lens 143 is a condenser lens that collimates yellow component light so that the liquid crystal panel 30Ye is irradiated with yellow component light.

The lenses 181 to 183 are relay lenses that cause blue component light to approximately form an image on the liquid crystal panel 30B. The lenses 181, 184 and 185 are relay lenses that cause green component light to approximately form an image on the liquid crystal panel 30G. The lenses 186, 187 and 185 are relay lenses that guide yellow component light to the liquid crystal panel 30G side and cause yellow component light to approximately form an image on the liquid crystal panel 30G while controlling expansion of yellow component light. The lenses 188 to 190 are relay lenses that cause red component light to approximately form an image on the liquid crystal panel 30R.

(Function and Effect)

According to the projection-type image display apparatus 100 of the third embodiment, yellow component light is superimposed on green component light and the resultant light is supplied to the cross dichroic cube 60. Accordingly, it is possible to improve luminance of the image appropriately without losing the color balance in consideration of relative luminous efficiency. Here, it should be noted that the range of color that a person perceives as being green is wider than the range of color that a person perceives as being red or blue. For this reason, even if yellow component light is superimposed on green component light, the color balance with consideration given to relative luminous efficiency is not easily lost.

Fourth Embodiment

The following will explain a fourth embodiment with reference to the drawing. The following will explain mainly the difference between the aforementioned third and fourth embodiments. More specifically, the difference between the aforementioned third embodiment and the fourth embodiment lies in the method for the separation of respective color component light and the combination thereof.

(Schematic Configuration of Illumination Unit)

Figure 9:
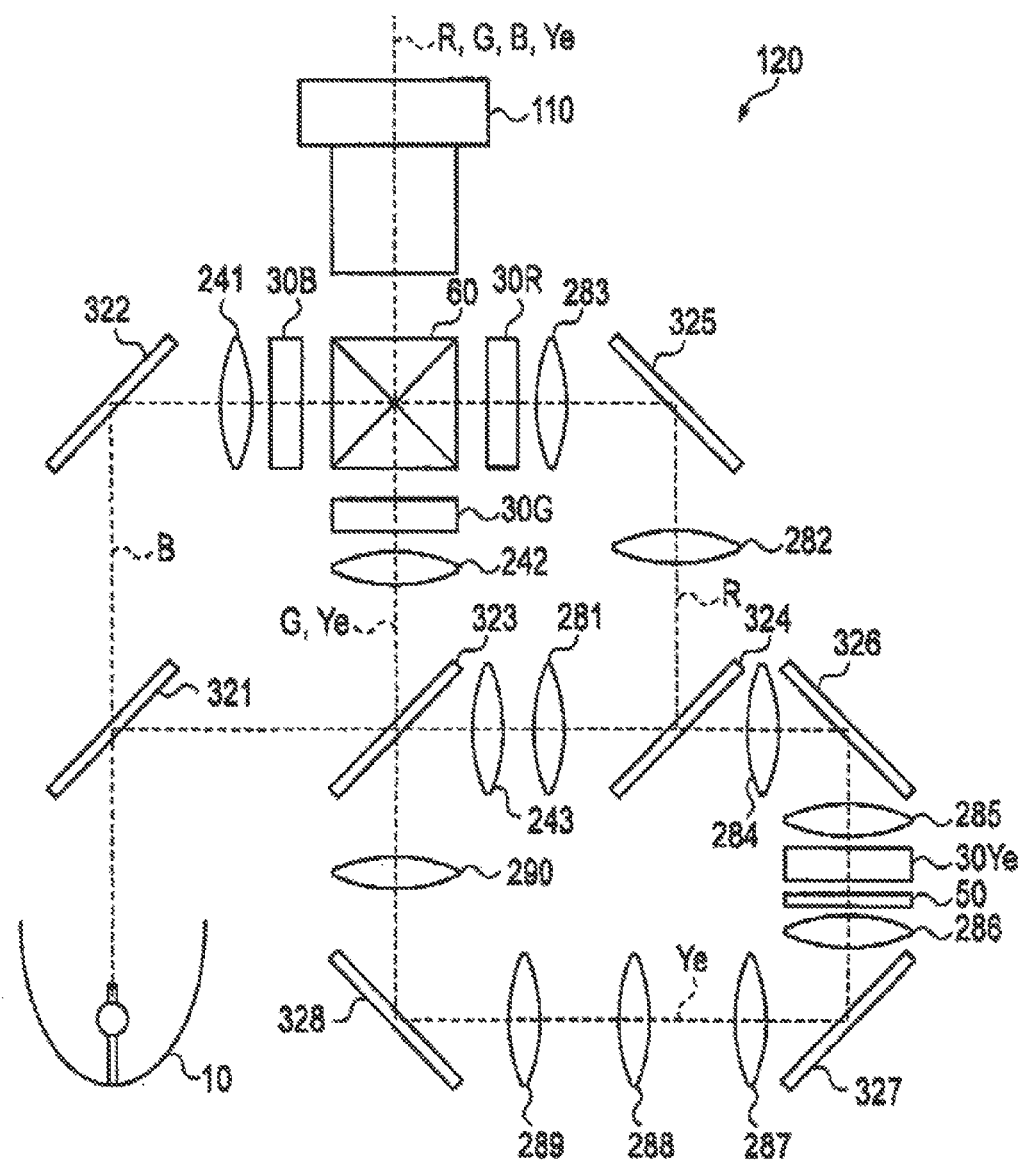
FIG. 9 is a view illustrating a schematic configuration of an illumination unit 120 according to a fourth embodiment of the present invention.

The following will explain the schematic configuration of the illumination unit according to the fourth embodiment with reference to the drawing. FIG. 9 is a view illustrating the schematic configuration of the illumination unit 120 according to the fourth embodiment. Additionally, it is to be noted that parts in FIG. 9 identical to those in FIG. 8 are assigned the same reference numerals as those in FIG. 8.

The illumination unit 120 has a plurality of mirror groups (mirrors 321 to 328). The mirror 321 is a dichroic mirror that transmits blue component light and reflects other light including red component light, green component light and yellow component light. The mirror 322 is a mirror that reflects blue component light on the liquid crystal panel 30B side. The to mirror 323 is a dichroic mirror that reflects green component light on the liquid crystal panel 30G side and transmits other light including red component light and yellow component light. Accordingly, the mirror 323 transmits yellow component light emitted from the liquid crystal panel 30Ye to pass through to the liquid crystal panel 30G side. The mirror 324 is a dichroic mirror that reflects red component light on the liquid crystal panel 30R side and transmits yellow component light. The mirror 325 is a mirror that reflects red component light on the liquid crystal panel 30R side. The mirror 326 is a mirror that reflects yellow component light on the liquid crystal panel 30Ye side. The mirror 327 and mirror 328 are mirrors that reflect and guide light (yellow component light) emitted from the liquid crystal panel 30Ye to the liquid crystal panel 30G side.

Herein, the mirror 321, the mirror 323 and the mirror 324 form a color separator configured to separate light emitted from the light source 10 into red component light, green component light, blue component light, and yellow component light.

The illumination unit 120 has a plurality of lens groups (lenses 241 to 243 and lenses 281 to 290). The lenses 241 and 242 are condenser lenses that collimate green component light and blue component light so that the respective liquid crystal panels 30 are irradiated with green component light and blue component light. The lens 243 is a condenser lens that collimates red component light so that the liquid crystal panel 30R is irradiated with red component light. Moreover, the lens 243 is a condenser lens that collimates yellow component light so that the liquid crystal panel 30Ye is irradiated with yellow component light.

The lenses 281 to 283 are relay lenses that cause red component light to approximately form an image on the liquid crystal panel 30R. The lenses 281, 284 and 285 are relay lenses that cause yellow component light to approximately form an image on the liquid crystal panel 30Ye. The lenses 286 to 290 and 242 are relay lenses that guide yellow component light to the liquid crystal panel 30G side and cause yellow component light to approximately form an image on the liquid crystal panel 30G while controlling expansion of yellow component light. In addition, yellow component light is caused to approximately form an image by the lenses 286 to 288 and is thereafter caused to approximately form an image again by the lenses 289, 290 and 242.

(Function and Effect)

According to the projection-type image display apparatus 100 of the fourth embodiment, the illumination unit 120 has a configuration in which lenses 326 to 328, liquid crystal panel 30Ye and wave plate 50 are added to the general configuration of a three-plate projection-type image display apparatus. In other words, since it is possible to use the configuration similar to the three-plate projection-type image display apparatus, an optical design load of the illumination unit 120 can be reduced.

Fifth Embodiment

The following will explain a fifth embodiment with reference to the drawing. The following will explain mainly the difference between the aforementioned fourth embodiment and the fifth embodiment. More specifically, the difference between the aforementioned fourth and fifth embodiments lies in the method for the separation of the respective color component light and the combination thereof.

(Schematic Configuration of Illumination Unit)

Figure 10:
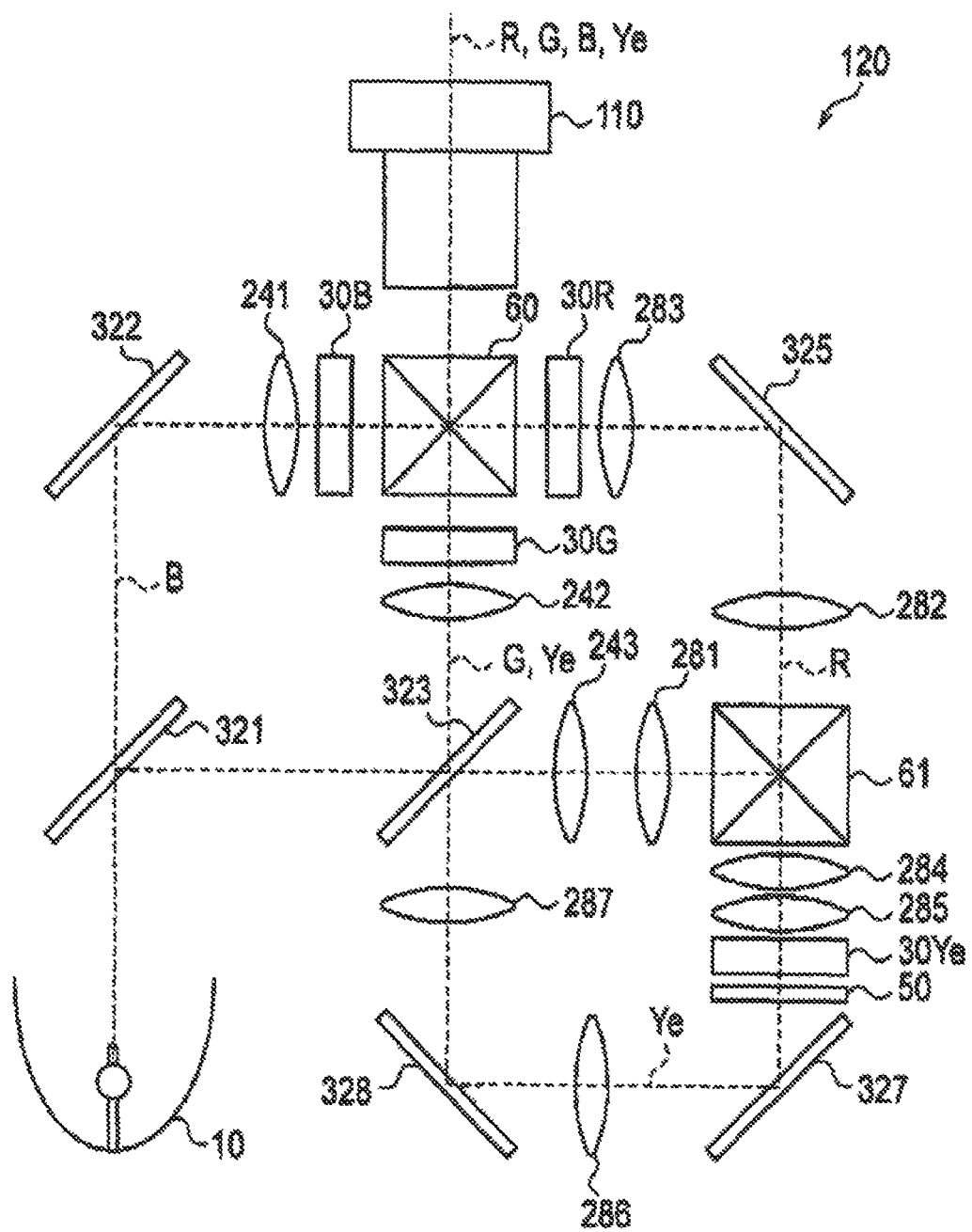
FIG. 10 is a view illustrating a schematic configuration of an illumination unit 120 according to a fifth embodiment of the present invention.

The following will explain the schematic configuration of the illumination unit according to the fifth embodiment with reference to the drawing. FIG. 10 is a view illustrating the schematic configuration of the illumination unit 120 according to the fifth embodiment. Additionally, it is to be noted that parts in FIG. 10 identical to those in FIG. 9 are assigned the same reference numerals as those in FIG. 9.

As illustrated in FIG. 10, the illumination unit 120 has a cross dichroic mirror 61 in place of the aforementioned mirrors 324 and 326.

The cross dichroic mirror 61 reflects red component light on the liquid crystal panel 30R side and reflects yellow component light on the liquid crystal panel 30Ye (mirror 327) side.

Herein, the mirror 321, the mirror 323 and the cross dichroic mirror 61 form a color separator configured to separate light emitted from the light source 10 into red component light, green component light, blue component light, and yellow component light.

(Function and Effect)

According to the projection-type image display apparatus 100 of the fifth embodiment, since the cross dichroic mirror 61 is used in place of the mirrors 324 and 326, it is possible to miniaturize the illumination unit 120 as compared with the fourth embodiment.

Sixth Embodiment

The following will explain a sixth embodiment with reference to the drawing. The following will explain mainly the difference between the aforementioned fourth and sixth embodiments. More specifically, in the aforementioned fourth embodiment, a transmission liquid crystal panel is used as a liquid crystal panel (the liquid crystal panel 30Ye) that modulates yellow component light. On the contrary, in the sixth embodiment, a reflection liquid crystal panel (LCOS) is used as a liquid crystal panel that modulates yellow component light.

(Schematic Configuration of Illumination Unit)

Figure 11:
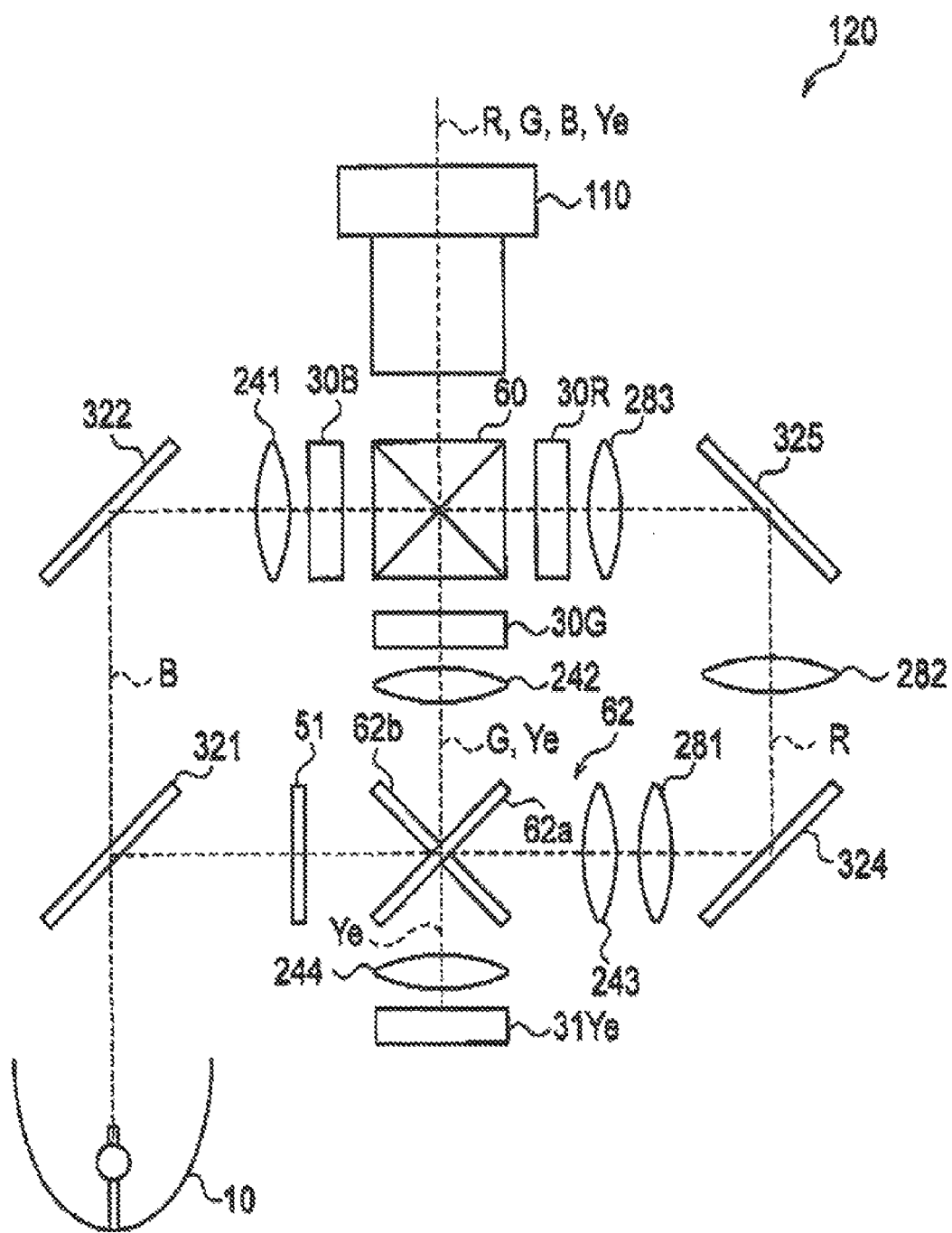
FIG. 11 is a view illustrating a schematic configuration of an illumination unit 120 according to a sixth embodiment of the present invention.

The following will explain the schematic configuration of the illumination unit according to the sixth embodiment with reference to the drawing. FIG. 11 is a view illustrating the schematic configuration of the illumination unit 120 according to the sixth embodiment. Additionally, it is to be noted that parts in FIG. 11 identical to those in FIG. 9 are assigned the same reference numerals as those in FIG. 9.

As illustrated in FIG. 11, the illumination unit 120 has a liquid crystal panel 31Ye, a narrow-band wave plate 51, and a cross mirror 62.

The liquid crystal panel 31Ye is a reflection liquid crystal panel that modulates yellow component light and then reflects the modulated yellow component light. Additionally, similar to the liquid crystal panel 30Ye, it is preferable that resolution of the liquid crystal panel 31Ye is lower than those of the liquid crystal panel 30R, liquid crystal panel 30G and liquid crystal panel 30B.

The narrow-band wave plate 51 is configured to rotate the polarization direction of light in a predetermined wave range by 90 degrees. More specifically, when the polarization directions of red component light, green component light, blue component light and yellow component light are aligned to P-polarized light, the narrow-band wave plate 51 rotates the polarization direction of yellow component light by 90 degrees. On the other hand, when the polarization directions of red component light, green component light, blue component light and yellow component light are aligned to S-polarized light, the narrow-band wave plate 51 rotates the polarization directions of red component light, green component light and blue component light (except yellow component light) by 90 degrees.

The cross mirror 62 has a dichroic mirror surface 62a, which reflects to green component light on the liquid crystal panel 30G side and transmits red component light, and a PBS mirror surface 62b, which reflects S-polarized yellow component light on the liquid crystal panel 31Ye side and transmits P-polarized yellow component light to the liquid crystal panel 30G side.

In addition, the liquid crystal panel 31Ye rotates S-polarized yellow component light, which entered the liquid crystal panel 31Ye, by 90 degrees and emits P-polarized yellow component light to the cross mirror 62 side.

The illumination unit 120 has a plurality of lens groups (lenses 241 to 244 and lenses 281 to 283).

The lenses 241 to 243 are condenser lenses that collimate red component light, green component light and blue component light so that the respective liquid crystal panels 30 are irradiated with red component light, green component light and blue component light. The lens 244 is a condenser lens that collimates yellow component light so that the liquid crystal panel 30Ye is irradiated with yellow component light.

The lenses 281 to 283 are relay lenses that cause red component light to approximately form an image on the liquid crystal panel 30R. The lenses 244 and 242 are relay lenses that guide yellow component light to the liquid crystal panel 30G side and causes yellow component light to approximately form an image on the liquid crystal panel 30G while controlling expansion of yellow component light.

Seventh Embodiment

The following will explain a seventh embodiment with reference to the drawing. The following will explain mainly the difference between the aforementioned fourth and seventh embodiments.

More specifically, in the aforementioned fourth embodiment, the optical element, which separates red component light and yellow component light, is a dichroic mirror (mirror 324) configured to separate combined light into each color component light according to the wavelength of color component light.

Meanwhile, in the seventh embodiment, the optical element, which separates red component light and yellow component light, is a polarization separation element configured to separate combined light into each color component light, according to the polarization direction of color component light. Accordingly, in the seventh embodiment, on the optical path of the combined light before combined light including red component light and to yellow component light enter the polarization separation element, a polarization rotation element is provided, which is configured to shift the polarization state of either red component light or yellow component light.
(Schematic Configuration of Illumination Unit)

Figure 12:
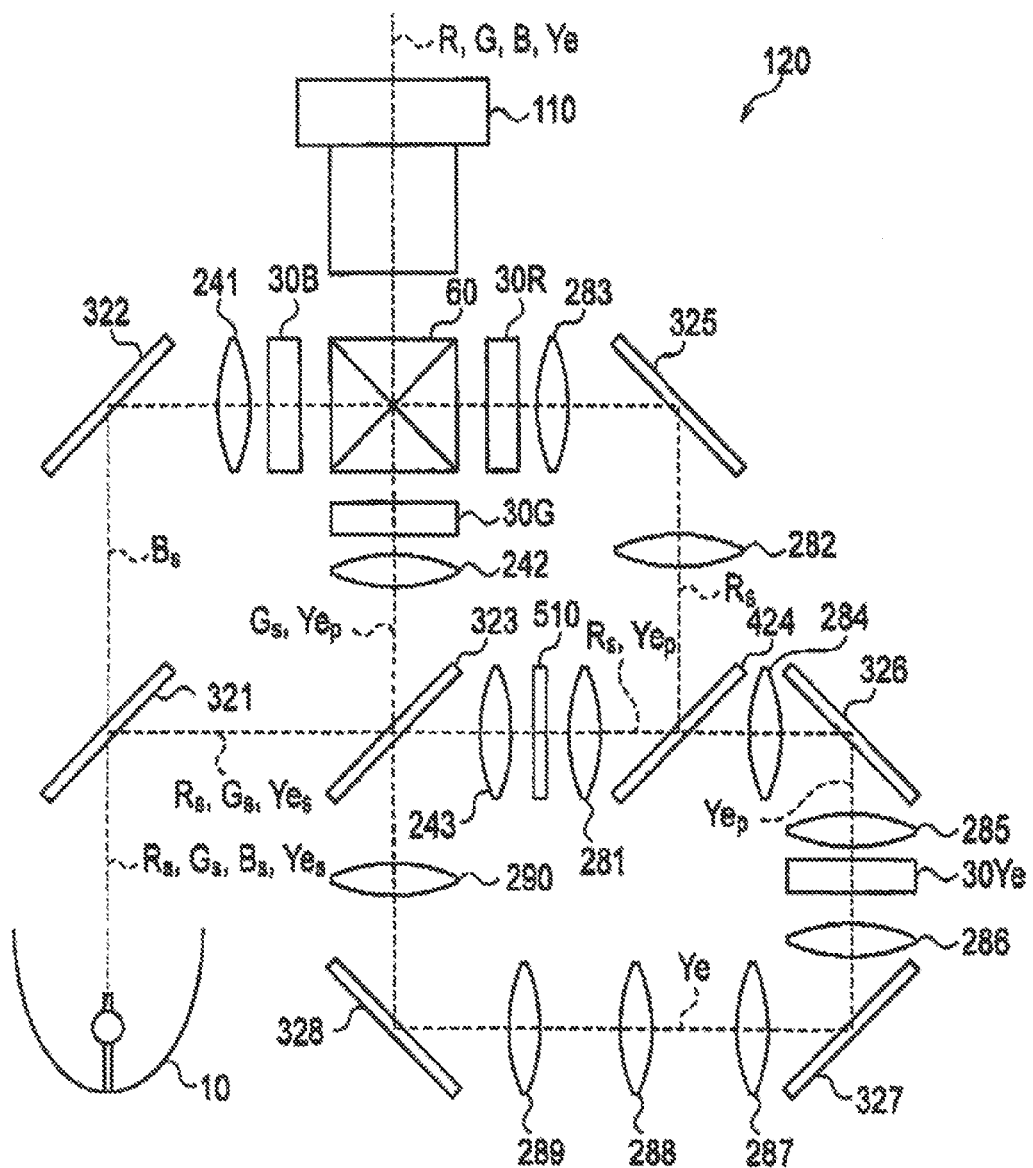
FIG. 12 is a view illustrating a schematic configuration of an illumination unit 120 according to a seventh embodiment of the present to invention.

The following will explain the schematic configuration of the illumination unit according to the seventh embodiment with reference to the drawing. FIG. 12 is a view illustrating the schematic configuration of the illumination unit 120 according to the seventh embodiment. Additionally, it is to be noted that parts in FIG. 12 identical to those in FIG. 9 are assigned the same reference numerals as those in FIG. 9. Furthermore, in the seventh embodiment, it should be noted that light emitted by the light source 10 is S-polarized before entering the mirror 321.

As illustrated in FIG. 12, the illumination unit 120 has a polarization separation element 424 in place of the mirror 324. Moreover, between the mirror 323 and the polarization separation element 424, there is provided a polarization rotation element 510 on the optical path of the combined light including red component light and yellow component light. Additionally, in the seventh embodiment, it should be noted that the aforementioned wave plate 50 is not provided in particular.

The polarization rotation element 510 is configured to rotate the polarization direction of either red component light or yellow component light (yellow component light in the seventh embodiment) by substantially 90 degrees. More specifically, the polarization rotation element 510 converts the polarization direction of yellow component light from S-polarization to P-polarization.

The polarization separation element 424 separates the combined light including red component light and yellow component light into red component light and yellow component light according to the polarization direction of color component light. More specifically, the polarization separation element 424 reflects S-polarized red component light and guides red component light to the liquid crystal panel 30R side. Meanwhile, the polarization separation element 424 transmits P-polarized yellow component light emitted from the polarization separation element 424 and guides yellow component light to the liquid crystal panel 30Ye side.

Here, the lenses 241 and 242 are condenser lenses that collimate green component light and blue component light so that the respective liquid crystal panels 30 are irradiated with green component light and blue component light. The lens 243 is a condenser lens that causes red component light and yellow component light to form an image on the polarization rotation element 510 so that the polarization rotation element 510 is irradiated with red component light and yellow component light. In other words, the polarization rotation element 510 is provided at a position (image surface) where red component light and yellow component light approximately form an image.

The lenses 281 to 283 are relay lenses that cause red component light, emitted from the polarization rotation element 510, to approximately form an image on the liquid crystal panel 30R. The lenses 281, 284 and 285 are relay lenses that cause yellow component light, emitted from the polarization rotation element 510, to approximately form an image on the liquid crystal panel 30Ye. The lenses 286 to 290 and 242 are relay lenses that guide yellow component light to the liquid crystal panel 30G side and cause yellow component light to approximately form an image on the liquid crystal panel 30G while controlling expansion of yellow component light. In other words, the liquid crystal panel 30G is provided at a position (image surface) where green component light and yellow component light approximately form an image. In addition, yellow component light is caused to approximately form an image by the lenses 286 to 288 and is thereafter caused to approximately form an image again by the lenses 289, 290 and 242.
(Function and Effect)

According to the projection-type image display apparatus 100 of the seventh embodiment, the optical element that separates red component light and yellow component light is the polarization separation element 424 that separates the respective color component light according to the polarization direction of color component light. This makes it possible to easily increase color purity of red component light and prevent occurrence of color irregularities as compared with the case of using the dichroic mirror that separates the respective color component light according to the wavelength range of color component light.

In particular, in the case of separating red component light and yellow component light, the wavelength range of red component light and that of yellow component light are close to each other, and accordingly, it should be noted that there is a high possibility that yellow component light will be to partially mixed with red component light in the case of using the dichroic mirror. When yellow component light is partially mixed with red component light, red component light changes to vermilion, and human eyes are sensitive to the change from red component light to vermilion (MacAdam ellipse). Moreover, a change in the amount of cutoff wavelength (gradation), which is changed according to an incident position on the dichroic mirror, can be considered, but there is difficulty in manufacturing dichroic mirrors having wide gradation.

Accordingly, it is extremely effective to use the polarization separation element 424 to separate red component light and yellow component light.

Eighth Embodiment

The following will explain an eighth embodiment with reference to the drawing. The following will explain mainly the difference between the aforementioned seventh and eighth embodiments.

More specifically, although not particularly mentioned in the seventh embodiment, on the optical path of red component light separated by the polarization separation element 424, there is provided a shielding unit configured to shield stray light (S-polarized yellow component light) superimposed on red component light. Likewise, on the optical path of yellow component light separated by the polarization separation element 424, there is provided a shielding unit configured to shield stray light (P-polarized red component light) superimposed on yellow component light.

Here, it should be noted that stray light is caused even if polarization directions of color component light are aligned using the polarization separation element 424, since there is difficulty in completely aligning the polarization directions of color component light with one polarization direction.
(Schematic Configuration of Illumination Unit)

Figure 13:
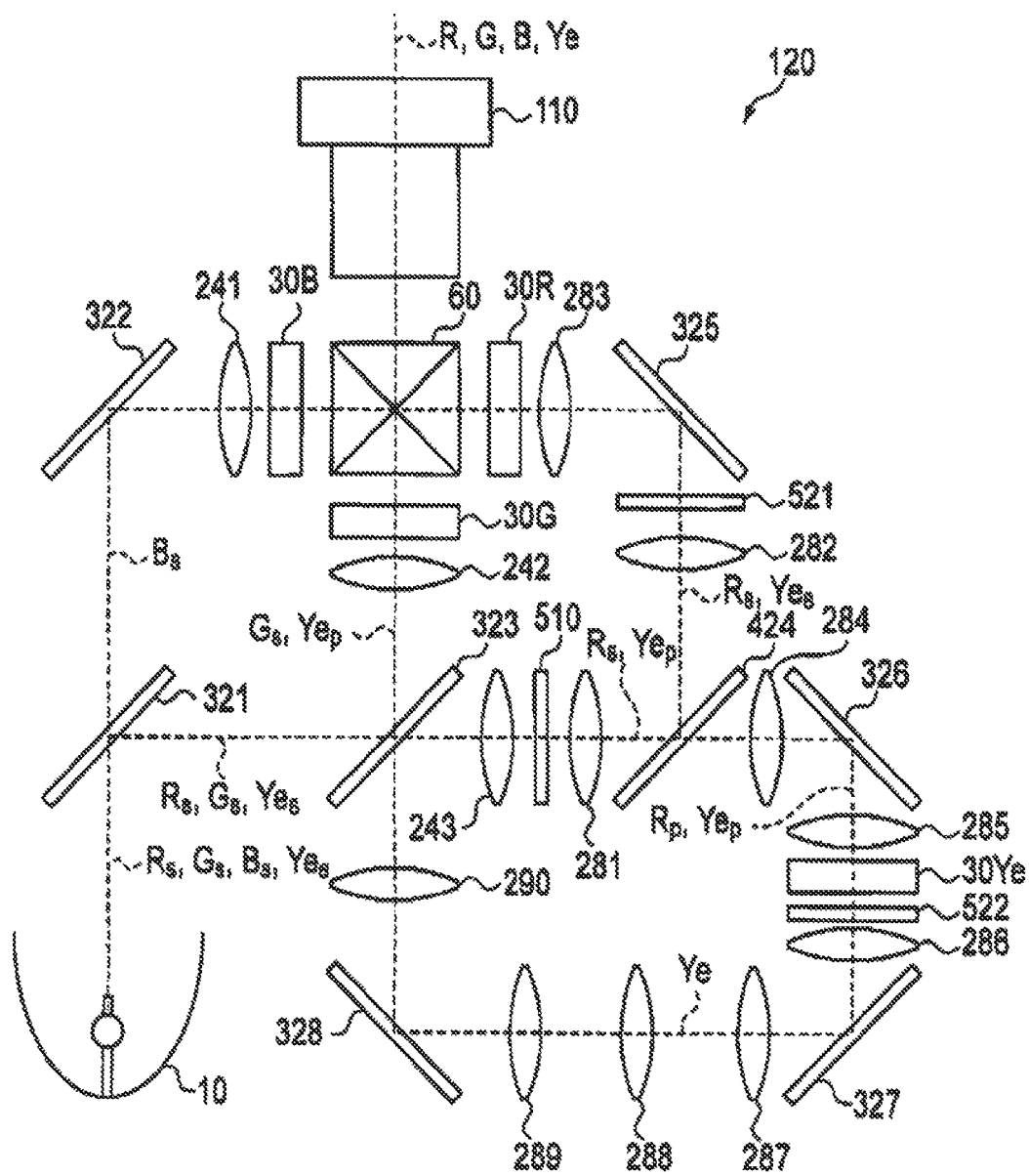
FIG. 13 is a view illustrating a schematic configuration of an illumination unit 120 according to an eighth embodiment of the present invention.

The following will explain the schematic configuration of the illumination unit according to the eighth embodiment with reference to the drawing. FIG. 13 is a view illustrating the schematic configuration of the illumination unit 120 according to the eighth embodiment. Additionally, it should be noted that parts in FIG. 13 identical to those in FIG. 12 are assigned the same reference numerals as those in FIG. 12.

As illustrated in FIG. 13, on the optical path of red component light separated by the polarization separation element 424, the illumination unit to 120 is provided with a color filter 521 that shields stray light (S-polarized yellow component light) superimposed on red component light. Likewise, on the optical path of yellow component light separated by the polarization separation element 424, the illumination unit 120 is provided with a color filter 522 that shields stray light (P-polarized red component light) superimposed on yellow component light.

The color filter 521 is an optical element that transmits red component light and shields other color component light (S-polarized yellow component light). Likewise, the color filter 522 is an optical element that transmits yellow component light and shields other color component light (P-polarized red component light).

Incidentally, only either color filter 521 or color filter 522 may be provided.

Moreover, the shielding unit configured to shield stray light is not limited to the color filters. More specifically, a color filter film, which transmits only red component light, may be deposited onto a surface of a lens (for example, lens 282 or 283) provided on the optical path of red component light separated by the polarization separation element 424. Likewise, a color filter film, which transmits only yellow component light, may be deposited onto a surface of a lens (for example, any one of lenses 284 to 290) provided on the optical path of yellow component light separated by the polarization separation element 424. Furthermore, on the light incident side of the polarization rotation element 510, there may be provided a polarizing plate that cuts an unnecessary polarization direction of light entering the polarization rotation element 510.

(Function and Effect)

According to the projection-type image display apparatus 100 of the eighth embodiment, stray light (S-polarized yellow component light) superimposed on red component light and stray light (P-polarized red component light) superimposed on yellow component light are cut by the color filter 521 and 522, respectively. Accordingly, it is possible to improve color purity of red component light and yellow component light.

Ninth Embodiment

The following will explain a ninth embodiment with reference to the drawing. The following will explain mainly the difference between the aforementioned seventh and ninth embodiments.

More specifically, the ninth embodiment is different from the seventh embodiment in the number of lenses provided on the optical path of yellow component light separated by the mirror 323. Furthermore, the positions where the liquid crystal panel 30Ye and the polarization rotation element 510 are provided are described in detail later.

(Schematic Configuration of Illumination Unit)

Figure 14:
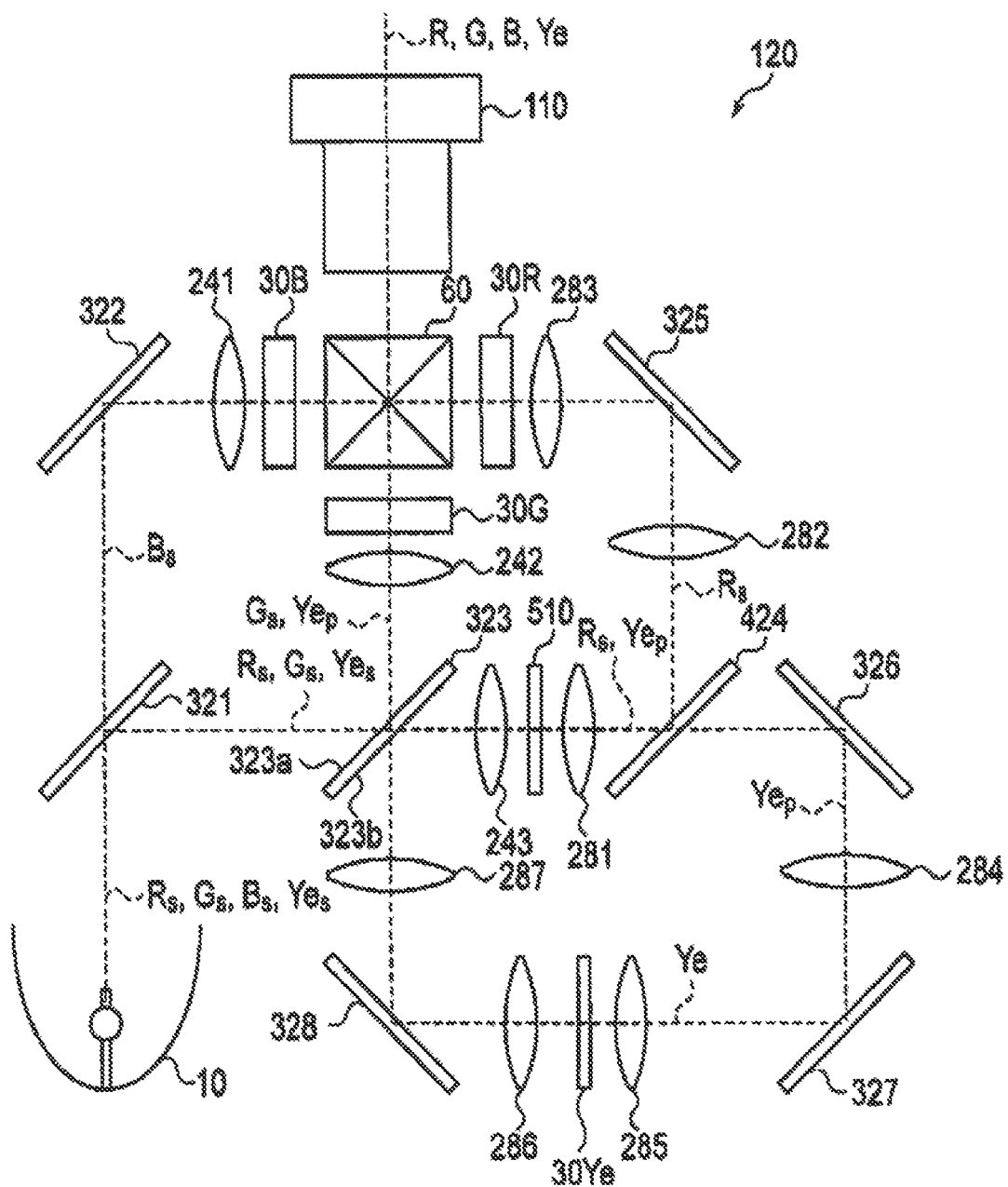
FIG. 14 is a view illustrating a schematic configuration of an illumination unit 120 according to a ninth embodiment of the present invention.

The following will explain the schematic configuration of the illumination unit according to the ninth embodiment with reference to the drawing. FIG. 14 is a view illustrating the schematic configuration of the illumination unit 120 according to the ninth embodiment. Additionally, it is to be noted that parts in FIG. 14 identical to those in FIG. 12 are assigned the same reference numerals as those in FIG. 12.

As illustrated in FIG. 14, the illumination unit 120 has a plurality of lens groups (lenses 241 to 243 and 281 to 287).

Here, the lenses 241 and 242 are condenser lenses that collimate green component light and blue component light so that the respective liquid crystal panels 30 are irradiated with green component light and blue component light. The lens 243 is a condenser lens that causes red component light and yellow component light to form an image on the polarization rotation element 510 so that the polarization rotation element 510 is irradiated with red component light and yellow component light. In other words, the polarization rotation element 510 is provided at a position (image surface) where red component light and yellow component light approximately form an image.

The lenses 281 to 283 are relay lenses that cause red component light, emitted from the polarization rotation element 510, to approximately form an image on the liquid crystal panel 30R. The lenses 281, 284 and 285 are relay lenses that cause yellow component light, emitted from the polarization rotation element 510, to approximately form an image on the liquid crystal panel 30Ye. The lenses 286, 287 and 242 are relay lenses that guide yellow component light to the liquid crystal panel 30G side and cause yellow component light to approximately form an image on the liquid crystal panel 30G while controlling expansion of yellow component light. In other words, the liquid crystal panel 30Ye is provided at a position (image surface) where yellow component light approximately forms an image. Furthermore, the liquid crystal panel 30G is provided at a position (image surface) where green to component light and yellow component light approximately form an image.

Additionally, it should be noted that the ninth embodiment is based on the assumption that each color component light passes through a set of three relay lenses after approximately forming an image, whereby each color component light approximately forms an image again. Note that each color component light approximately forms an image by three relay lenses (second lens) that form one pair in a state that the top and bottom and the right and left positions are inverted.

Here, in the ninth embodiment, the mirror 323 is a dichroic mirror that separates the combined light including green component light (superimposed component light) and yellow component light (and red component light) into yellow component light (and red component light) and green component light (superimposed component light). The mirror 323 has a first light incident surface 323a that combined light including green component light (superimposed component light) and yellow component light enters and a second light incident surface 323b that yellow component light separated by the mirror 323 reenters.

In a relay optics where yellow component light is separated by the mirror 323 and reenters the second light incident surface 323b, there is provided a relay lens group that inverts the top and bottom and the right and left positions of the image surface of yellow component light an even number of times. Meanwhile, in this relay optics, there is provided a mirror group that inverts the right and left positions of the image surface of yellow component light an odd number of times.

More specifically, yellow component light entering the first light incident surface 323a is caused to approximately form an image on the polarization rotation element 510. The right and left positions of the image surface of the approximately formed image of yellow component light on the polarization rotation element 510 are inverted by the mirror 326 (first right and left inversion). The top and bottom and the right and left positions of the image surface of the approximately formed image of yellow component light on the polarization rotation element 510 are inverted by the lens 284 out of the set of relay lenses (lenses 281, 284 and 285) (first top and bottom and right and left inversions). The right and left positions of the image surface of the approximately formed image of yellow component light on the polarization rotation element 510 are inverted by the mirror 327 (second right and left inversion). The right and left positions of the image surface of the approximately formed image of yellow component light on the polarization rotation element 510 are inverted by the mirror 328 (third right and left inversion). The top and bottom and the right and left positions of the image surface of the approximately formed image of yellow component light on the polarization rotation element 510 are inverted by the lens 287 out of the set of relay lenses (lenses 286, 287 and 242) (second top and bottom and right and left inversions).

As a result, a position where a beam of yellow component light enters the first light incident surface 323a is substantially equal to a position where the beam of yellow component light is reenters the second light incident surface 323b.

Figure 15:
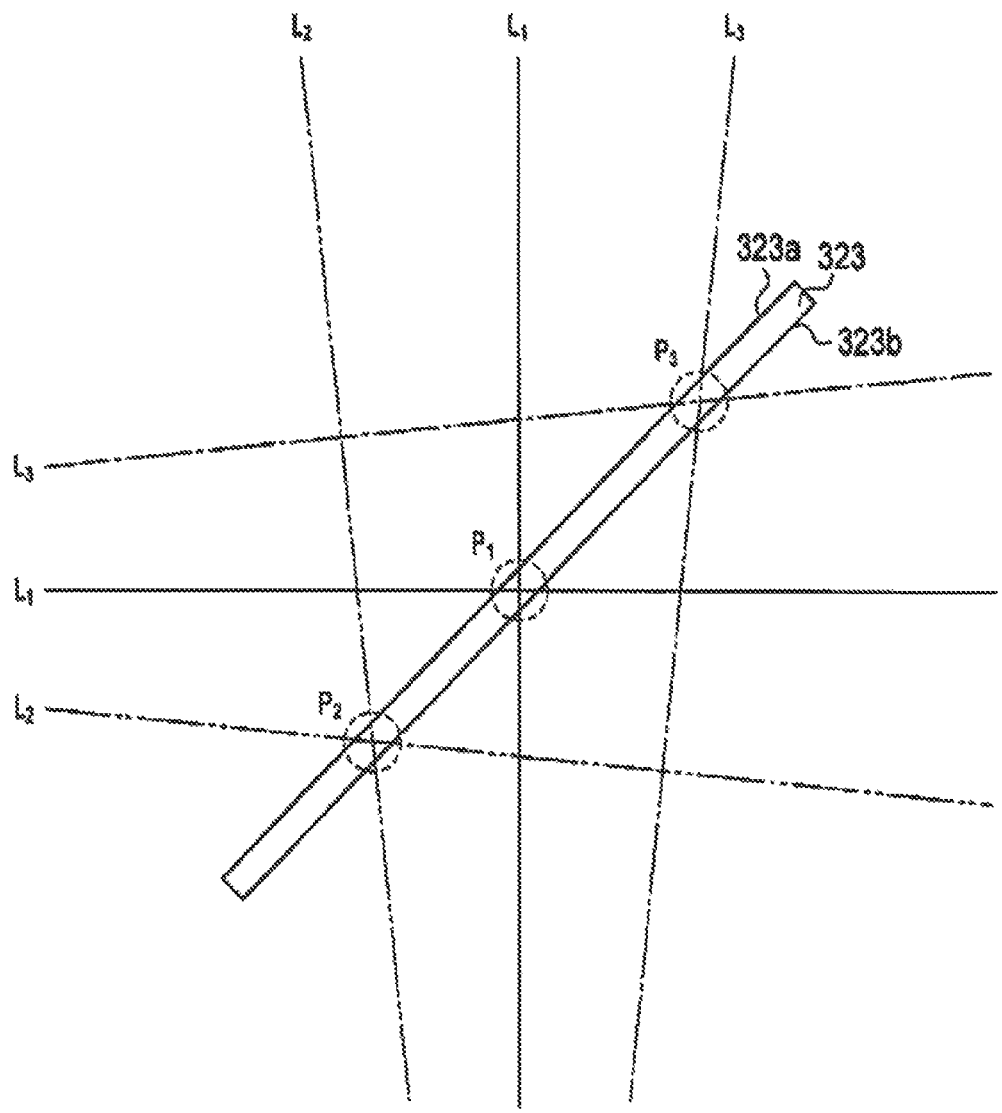
FIG. 15 is an enlarged view of a mirror 323 according to the ninth embodiment of the present invention.

More specifically, as illustrated in FIG. 15, a position ($P_2$) where a beam of yellow component light ($L_2$) enters the first light incident surface 323a is substantially equal to a position ($P_2$) where the beam of yellow component light ($L_2$) reenters the second light incident surface 323b. Likewise, a position ($P_3$) where a beam of yellow component light ($L_3$) enters the first light incident surface 323a is substantially equal to a position ($P_3$) where the beam of yellow component light ($L_3$) reenters the second light incident surface 323b. In addition, a position ($P_1$) where a beam of yellow component light ($L_1$) enters the first light incident surface 323a is, of course, substantially equal to a position ($P_1$) where the beam of yellow component light ($L_1$) reenters the second light incident surface 323b.

(Function and Effect)

According to the projection-type image display apparatus 100 of the ninth embodiment, the polarization rotation element 510 is provided at the position (image surface) where yellow component light approximately forms an image, and the liquid crystal panel 30Ye is provided at the position (image surface) where yellow component light emitted from the polarization rotation element 510 approximately forms an image again. In other words, the liquid crystal panel 30Ye and the polarization rotation element 510 are provided at the position where a dispersion angle of yellow component light is reduced and an in-plane brightness distribution becomes uniform. Accordingly, it is possible to miniaturize the liquid crystal panel 30Ye and the polarization rotation element 510.

Here, since the cutoff wavelength generally shifts according to an to incidence angle of each color component light, a gradation is formed on the first light incident surface 323a of the mirror 323 (dichroic mirror) so as to change the cutoff wavelength little by little. In the ninth embodiment, the position where the beam of yellow component light enters the first light incident surface 323a (first time) is substantially equal to the position where the beam of yellow component light reenters the second light incident surface 323b (second time).

Accordingly, even when the gradation is formed on the mirror 323 (dichroic mirror), it is possible to reduce the loss of yellow component light. In other words, it is possible to suppress a reduction in light amount of yellow component light guided to the liquid crystal panel 30G side due to the difference between the position where the beam of yellow component light passes at the first time and the position where the beam of yellow component light passes at the second time.

Tenth Embodiment

The following will explain a tenth embodiment with reference to the drawing. The following will explain mainly the difference between the aforementioned embodiments and the tenth embodiment.

More specifically, although not particularly described in the aforementioned embodiments, the tenth embodiment describes a mechanism for shielding yellow component light by the liquid crystal panel 30G in the case of turning off yellow component light. In the tenth embodiment, it should be noted that the liquid crystal panel 30Ye has no polarizing plate in view of cost reduction and the like.

In the following description, note that the tenth embodiment is explained based on the ninth embodiment among the aforementioned embodiments.

(Configuration of Light Valve)

Figure 16A:
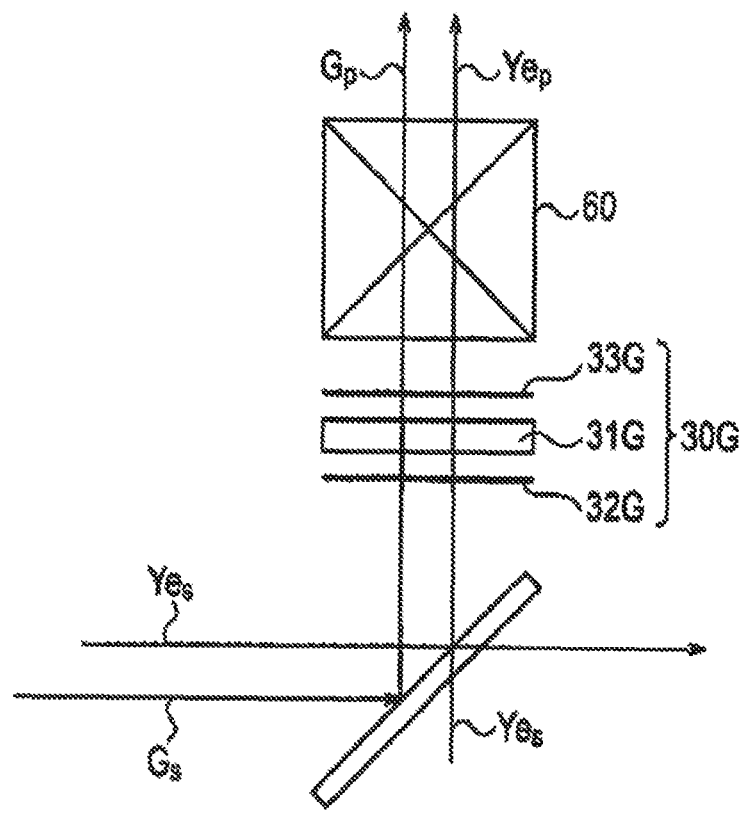
FIGS. 16A and 16B are view illustrating configuration of a liquid crystal panel 30G according to a tenth embodiment of the present invention.
Figure 16B:
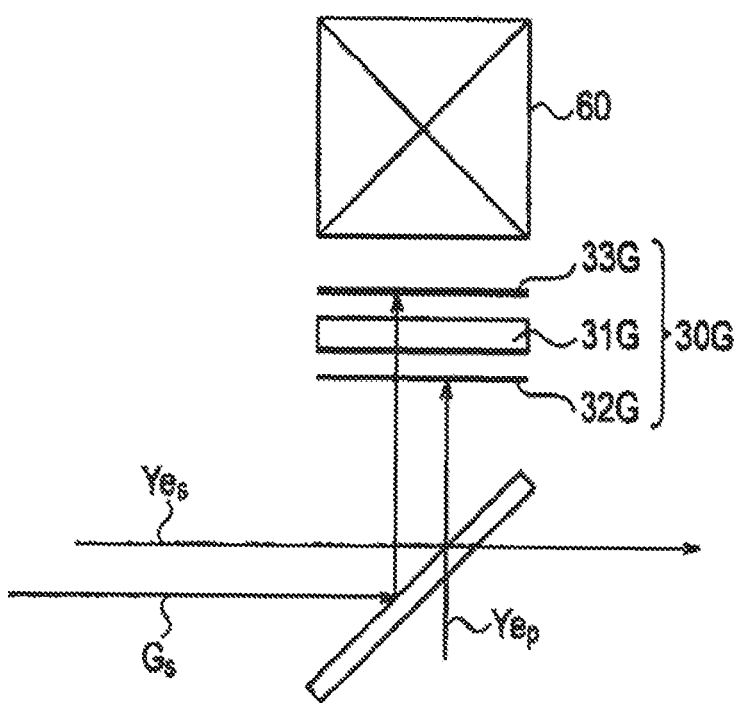

The following will explain the configuration of the light valve of the tenth embodiment with reference to the drawing. FIGS. 16A and 16B are views illustrating the configuration of a liquid crystal panel 30G according to the tenth embodiment.

As illustrated in FIGS. 16A and 16B, the liquid crystal panel 30G (a certain light valve) has a liquid crystal body 31G, a polarizing plate 32G and a polarizing plate 33G.

The liquid crystal body 31G modulates color component light by rotating the polarization direction of color component light transmitted through the polarizing plate 32G.

The polarizing plate 32G is provided on the light incident side of the liquid crystal body 31G, transmits color component light of a first polarized direction (S-polarization in tenth embodiment) and shields color component light of a second polarized direction (P-polarization in tenth embodiment).

The polarizing plate 33G is provided on the light emitting side of the liquid crystal body 31G, transmits color component light of the second polarized direction (P-polarization in tenth embodiment) and shields color component light of the first polarized direction (S-polarization in tenth embodiment).

As illustrated in FIG. 16A, in the case of turning ON yellow component light, the liquid crystal panel 30Ye adjusts the polarization direction of yellow component light so that the polarizing plate 32G transmits yellow component light. In other words, the liquid crystal panel 30Ye adjusts the polarization direction of yellow component light so that the polarization directions thereof is aligned with the polarization direction of green component light incident on the liquid crystal body 31G. Incidentally, taking the aforementioned ninth embodiment as an example, the liquid crystal panel 30Ye converts P-polarized yellow component light to S-polarized yellow component light.

Meanwhile, as illustrated in FIG. 16B, in the case of turning OFF yellow component light, the liquid crystal panel 30Ye adjusts the polarization direction of yellow component light so that the yellow component light is shielded by the polarizing plate 32G. In other words, the liquid crystal panel 30Ye adjusts the polarization direction of yellow component light so that the polarization direction thereof is substantially orthogonal to that of green component light incident on the liquid crystal body 31G. Incidentally, taking the aforementioned ninth embodiment as an example, the liquid crystal panel 30Ye transmits P-polarized yellow component light as it is.

Additionally, as illustrated in FIG. 16B, in the case of turning OFF green component light (a certain color component light), the liquid crystal body 31G transmits S-polarized green component light as it is without rotating the polarization direction thereof. Accordingly, green component light emitted from the liquid crystal body 31G is shielded by the polarizing plate 33G.

Here, the liquid crystal panel 30G may either be the first type liquid crystal panel or the second type liquid crystal panel. In the tenth embodiment, any one of the liquid crystal panels may be used, as long as green component light is shielded by the polarizing plate 33G in the case of turning OFF green component light, and yellow component light is shielded by the polarizing plate 32G in the case of turning OFF yellow component light.

Additionally, although in the tenth embodiment explanation has been given for the case where yellow component light is superimposed on green component light and the liquid crystal panel 30G is irradiated with the resultant light, the present invention is not limited to this. More specifically, the tenth embodiment may be applied to a case in which yellow component light is superimposed on blue component light and the liquid crystal panel 30B is irradiated with the resultant light.

(Function and Effect)

According to the projection-type image display apparatus 100 of the tenth embodiment, green component light is shielded by the polarizing plate 33G in the case of turning OFF green component light, and yellow component light is shielded by the polarizing plate 32G in the case of turning OFF yellow component light.

Generally, in the case of turning OFF color component light, the color component light is shielded by the polarizing plate provided on the light emitting side of the liquid crystal panel. In other words, generally, not only green component light but also yellow component light are turned OFF by shielding yellow component light by the polarizing plate 33G.

However, in the tenth embodiment, the polarizing plate that shields yellow component light is the polarizing plate 32G provided on the light incident side of the liquid crystal panel. Accordingly, it is possible to prevent the polarizing plate 33G, provided on the light incident side, from being discolored by the heat.

Eleventh Embodiment

The following will explain an eleventh embodiment with reference to the drawing. The eleventh embodiment will describe the configuration of the aforementioned liquid crystal panel 30.

(Configuration of Light Valve)

Figure 17:
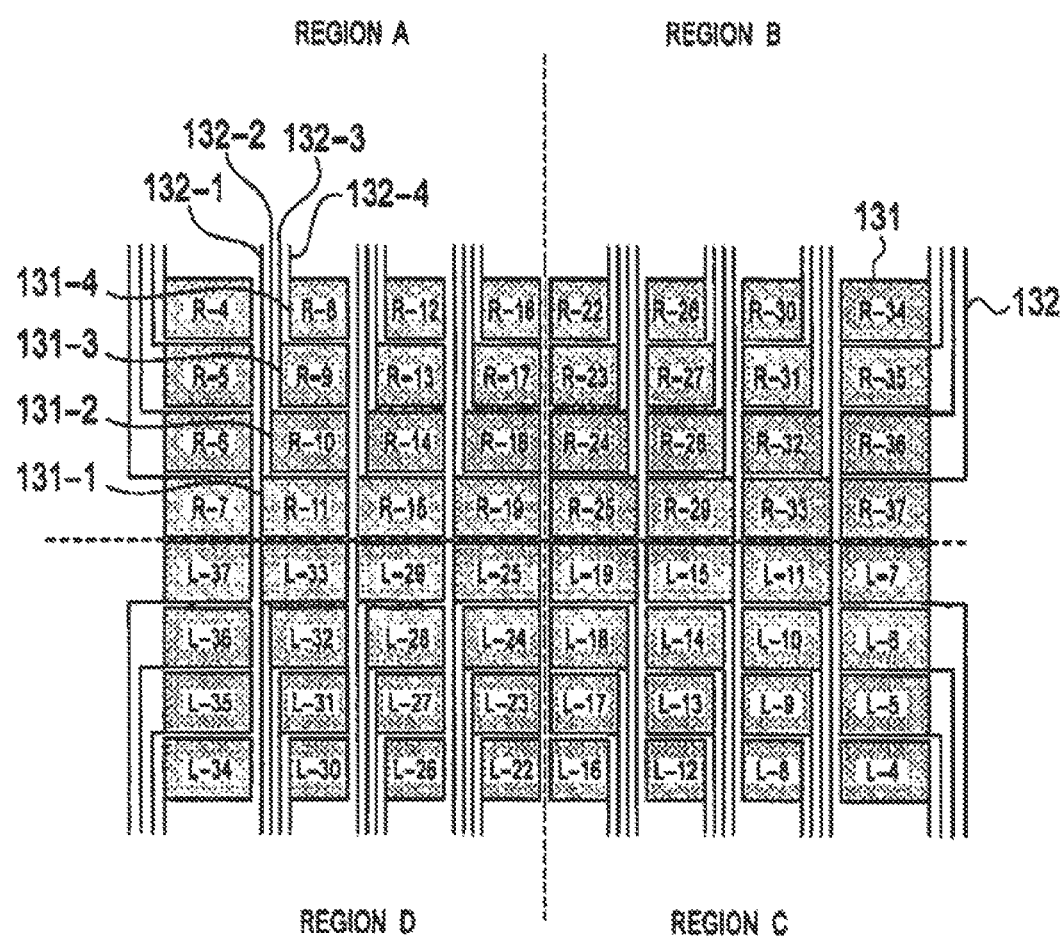
FIG. 17 is a view illustrating a configuration of a liquid crystal panel 30 according to an eleventh embodiment of the present invention.

The following will explain the configuration of the light valve of the eleventh embodiment with reference to the drawing. FIG. 17 is a view illustrating the configuration of the liquid crystal panel 30 (the particularly, liquid crystal panel 30Ye or the liquid crystal panel 31Ye) in the eleventh embodiment. In addition, FIG. 17 is a view of the liquid crystal panel 30 seen from the light incident surface (or light emitting surface) side thereof.

As illustrated in FIG. 17, the liquid crystal panel 30 has a plurality of segments 131 and a plurality of transparent electrodes 132.

The segments 131 are arranged in a matrix and can be considered as four regions (regions A to D).

In the regions (regions A and B) formed on the upper half of the liquid crystal panel 30, the higher the position of the segment 131 is, the smaller the area of the segment 131 becomes. On the other hand, in the regions (regions C and D) formed on the lower half of the liquid crystal panel 30, the lower the position of the segment 131 is, the smaller the area of the segment 131 becomes.

Meanwhile, in the regions (regions A and D) formed on the left half of the liquid crystal panel 30, the transparent electrode 132 is provided on the left side of each segment 131. In the regions (regions B and C) formed on the right half of the liquid crystal panel 30, the transparent electrode 132 is provided on the right side of each segment 131.

Herein, the configuration of each segment 131 will be more specifically explained taking segments 131-1 to 131-4 as examples.

The area of the segment 131-2 provided above the segment 131-1 is smaller than that of the segment 131-1 by the width of the transparent electrode 132-1 connected to the segment 131-1.

The area of the segment 131-3 provided above the segment 131-2 is smaller than that of the segment 131-2 by the width of the transparent electrode 132-2 connected to the segment 131-2. In other words, the area of the segment 131-3 is smaller than that of the segment 131-1 by the widths of the transparent electrodes 132-1 and 132-2.

The area of the segment 131-4 provided above the segment 131-3 is smaller than that of the segment 131-3 by the width of the transparent electrode 132-3 connected to the segment 131-3. In other words, the area of the segment 131-4 is smaller than that of the segment 131-1 by the widths of the transparent electrodes 132-1 to 132-3.

Each of the transparent electrodes 132 is formed of a transparent material and is connected to each segment 131. Moreover, the transparent electrodes 132 are provided in the space generated by the reduction in areas of the segments 131.

In the regions (regions A and B) formed on the upper half of the liquid crystal panel 30, the transparent electrodes 132 are connected to an FPC: Flexible Printed Circuit, (not illustrated) formed on the upper side of the liquid crystal panel 30. In the regions (regions C and D) formed on the lower half of the liquid crystal panel 30, the transparent electrodes 132 are connected to an FPC (not illustrated) formed on the lower side of the liquid crystal panel 30.

Incidentally, although the eleventh embodiment has illustrated the case in which FPCs are provided on the upper and lower portions of the liquid crystal panel 30, the present invention is not limited to this. More specifically, FPCs may be provided at the right and left sides of the liquid crystal panel 30. In this case, the configuration illustrated in FIG. 17 may be, of course, rotated by 90 degrees.

(Function and Effect)

According to the liquid crystal panel 30 of the eleventh embodiment, in the case where it is unfavorable to route the transparent electrodes 132 in the thickness direction of the liquid crystal panel 30, that is, in the case where it is favorable to route the transparent electrodes 132 in the light incident surface (light emitting surface), it is possible to efficiently reduce the space in which the transparent electrodes 132 are provided. In other words, the proportion of each segment 131 provided in the liquid crystal panel 30 is increased, thereby making it possible to obtain a sufficient modulation effect caused by each segment 131.

By using the transparent electrode 132 as the electrode connected to each segment 131, a decrease in utilization efficiency of light attributable to electrodes can be prevented.

By providing FPCs on the upper and lower portions of the liquid crystal panel 30, the length of each transparent electrode 132 is shortened. Thus, electric resistance in the transparent electrodes 132 can be reduced, and the width of each transparent electrode 132 can be made narrower.

[Utilization of Yellow Component Light]

Figure 18:
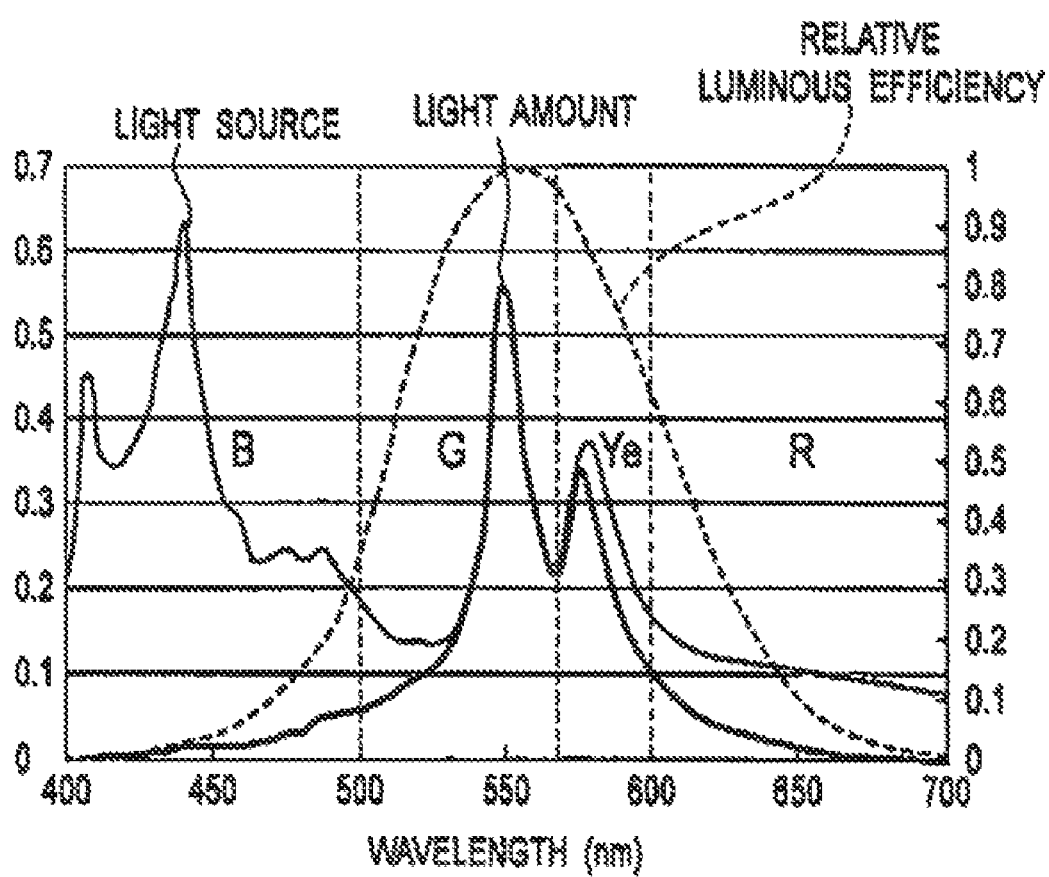
FIG. 18 is a view explaining light emitted by a light source 10 (UHP lamp).

The following will explain the utilization of yellow component light with reference to the drawing. FIG. 18 is a view for explaining light emitted by the aforementioned light source 10 (UHP lamp). Here, the amount of light is derived from a product of energy of light emitted from the light source 10, and relative luminous efficiency.

As illustrated in FIG. 18, there is a tendency that the relative luminous efficiency reaches a peak at a wavelength range corresponding to green component light and decreases at a short wavelength side (blue component light) and at a long wavelength side (red component light). Accordingly, even if the energy of light emitted from the light source 10 such as a UHP lamp reaches a peak at around 440 nm (blue component light), around 550 nm (green component light) and around 580 nm (yellow component light) in this order, the amount of light emitted from the light source 10 reaches a maximum at the wavelength range corresponding to green component light.

In addition, the amount of light emitted from the light source 10 reaches the second highest value at a wavelength range corresponding to yellow component light, next to the wavelength range corresponding to green component light.

Thus, in view of the energy of light emitted from the light source 10 and relative luminous efficiency, it can be seen that yellow component light largely contributes to a light amount of an image.

Accordingly, projection-type image display apparatuses have been proposed that are configured to utilize yellow component light that was not conventionally utilized. For example, proposed are a projection-type image display apparatus which does not have color filters that shield yellow component light (for example, Japanese Patent Publication No. 2000-137289) and a four-plate projection-type image display apparatus (for example, Japanese Patent Publication No. 2002-287247).

In the aforementioned embodiments, using yellow component light leads to improvement in luminance and employing liquid crystal panel 30Ye (or liquid crystal panel 31Ye) suppresses a reduction in color reproduction capability. Moreover, since another liquid crystal panel 30 is irradiated with yellow component light which is emitted from the liquid crystal panel 30Ye (or liquid crystal panel 31Ye), the back focus of the projection lens unit 110 does not become long as compared with the conventional case.

Other Embodiments

The present invention has been described by the abovementioned embodiments, but the description and drawings which constitute a part of this disclosure should not be understood as to limit the scope of the present invention. For those who are skilled in the art, various alternative embodiments, examples, and operating techniques will be apparent from this disclosure.

For example, although in the foregoing embodiments, the fourth color component light is yellow component light, the present invention is not limited to this. The fourth color component light may be cyan component light, magenta component light or the like.

Although the fourth color component light is a single color component light in the foregoing embodiments, the present invention is not limited to this. The fourth color component light may be multiple color component light.

Although in the foregoing embodiments, the resolution of the liquid crystal panel 30Ye is lower than those of the liquid crystal panel 30R, the liquid crystal panel 30G and the liquid crystal panel 30B, the present invention is not limited to this. The resolution of the liquid crystal panel 30Ye may be equivalent to those of the liquid crystal panel 30R, the liquid crystal panel 30G and the liquid crystal panel 30B. Furthermore, the resolution of the liquid crystal panel 30Ye may be "1", that is, the liquid crystal panel 30Ye may have no resolution.

Although in the foregoing embodiments, the wave plate 50, which rotates the polarization direction of yellow component light by 90 degrees, is provided on the optical path of yellow component light before yellow component light is superimposed on red component light (or green component light), the present invention is not limited to this. A narrow-band wave plate, which rotates only the polarization direction of yellow component light, may be provided on the optical path of combined light emitted from the cross dichroic cube 60.

In the aforementioned ninth embodiment, the liquid crystal panel 30Ye is provided at the position where the image surface of yellow component light is formed. However, as shown in the eleventh embodiment, when the liquid crystal panel 30Ye has the resolution, the liquid crystal panel 30Ye may be provided at a position which is shifted slightly (by about several millimeters) from the position where the image surface of yellow component light is formed. This makes it possible to prevent the transparent electrodes 132 and the like (including general metallic electrodes) from producing linear irregularities corresponding to the transparent electrodes 132 and the like on a projection image.

When the transparent electrodes 132 are provided in the liquid crystal panel 30Ye, there is a possibility that linear irregularities (moire) will occur by diffraction of yellow component light emitted from the segments 131, and diffraction of yellow component light which transmits through the transparent electrodes 132. Additionally, when a vertical axis and a horizontal axis of the liquid crystal panel 30Ye are parallel to those of another liquid crystal panel 30, the line irregularities (moire) becomes prominent. Accordingly, it is preferable that the transparent electrodes 132 provided in the liquid crystal panel 30Ye be disposed parallel to a diagonal axis of another liquid crystal panel 30 so not to be parallel to the vertical axis and the horizontal axis of another liquid crystal panel 30.

What is claimed is:

1. A projection display apparatus comprising:
   a light source;
   a light valve configured to modulate a light emitted from the light source;
   a light guiding member configured to divide the light emitted from the light source into a first component light, a second component light, and a third component light, and configured to guide divided light to the light valve; and
   a projection unit configured to project a light modulated by the light valve; wherein
   the second component light combined with other component light enters the light valve, and
   the other component light is modulated with the second component light; and
   the first component light is not modulated with the third component light.

2. The projection display apparatus according to claim 1, the second component light is a green component light, and the other component light is a light having a wavelength longer than a wavelength of the green component light.

3. A projection display apparatus comprising:
   a light source;
   a light valve configured to modulate a light emitted from the light source;
   a light guiding member configured to divide the light emitted from the light source into a first component light, a second component light, and a third component light, and configured to guide divided light to light valve; and
   a projection unit configured to project a light modulated by the light valve; wherein
   the second component light combined with other component light enters the light valve, and
   the other component light is modulated with the second component light, further comprising a first state where the second component light combined with the other component light enters the light valve, and a second state where the second component light enters the light valve without combined with the other component light enters the light valve.

4. The projection display apparatus according to claim 3, wherein the second component light is a green component light, and the other component light is a light having a wavelength longer than a wavelength of the green component light.

5. A projection display apparatus comprising:

a light source;

a light valve configured to modulate a light emitted from the light source;

a light guiding member configured to divide the light emitted from the light source into a first component light, a second component light, and a third component light, and configured to guide divided light to light valve; and a projection unit configured to project a light modulated by the light valve; wherein the second component light combined with other component light enters the light valve, and the other component light is modulated with the second component light, and wherein the light guiding member includes an optical element configured to selectively transmit or reflect the light according to a wavelength of the light, and a light beam of the light transmitted or reflected by the optical element is transmitted or reflected at the same position, when re-entering the optical element.

6. The projection display apparatus according to claim 5, wherein the second component light is a green component light, and the other component light is a light having a wavelength longer than a wavelength of the green component light.

7. A projection display apparatus comprising:

a light source;

a light valve configured to modulate a light emitted from the light source;

a light guiding member configured to divide the light emitted from the light source into a red component light, a green component light, and a blue component light, and configured to guide divided light to the light valve; and a projection unit configured to project a light modulated by the light valve; wherein the light guiding member includes an optical element configured to combine the green component light and other component light having a wavelength longer than a wavelength of the green component light, by reflecting the green component light and transmitting the other component light, the second component light combined with other component light enters the light valve, and the other component light is modulated with the second component light.

* * * * *